United States Patent
Barus et al.

(10) Patent No.: US 9,785,595 B2
(45) Date of Patent: Oct. 10, 2017

(54) MULTI-CHANNEL UNIVERSAL SERIAL BUS (USB) TO SUBRATE CHANNEL SYSTEMS

(71) Applicant: Lenovo Enterprise Solutions (Singapore) PTE. LTD., Singapore (SG)

(72) Inventors: Daniel J. Barus, Raleigh, NC (US); Robert M. Piper, Apex, NC (US); Donald G. Polak, Graham, NC (US)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 449 days.

(21) Appl. No.: 14/021,550

(22) Filed: Sep. 9, 2013

(65) Prior Publication Data
US 2015/0074312 A1 Mar. 12, 2015

(51) Int. Cl.
*G06F 13/40* (2006.01)

(52) U.S. Cl.
CPC ...... *G06F 13/4027* (2013.01); *G06F 13/4068* (2013.01)

(58) Field of Classification Search
USPC ..... 710/31, 38, 51, 52, 62, 64, 65, 105, 110, 710/305, 310, 313, 315, 316
See application file for complete search history.

(56) References Cited

U.S. PATENT DOCUMENTS

| | | | |
|---|---|---|---|
| 6,757,763 B1* | 6/2004 | Preiss et al. | 710/105 |
| 7,526,594 B2* | 4/2009 | Tseng et al. | 710/310 |
| 7,660,968 B2 | 2/2010 | Alfano et al. | |
| 7,761,728 B2* | 7/2010 | Cagno et al. | 713/501 |
| 8,261,662 B1 | 9/2012 | Shile et al. | |
| 8,375,115 B2 | 2/2013 | Partani et al. | |
| 9,087,163 B2* | 7/2015 | Amchislavsky | G06F 13/42 |
| 2004/0117525 A1* | 6/2004 | Lee | 710/104 |
| 2006/0174049 A1* | 8/2006 | Lin et al. | 710/308 |
| 2007/0112990 A1* | 5/2007 | Hayashita | 710/305 |
| 2008/0082716 A1 | 4/2008 | Alfano | |
| 2008/0177916 A1* | 7/2008 | Cagno et al. | 710/110 |
| 2008/0177917 A1* | 7/2008 | Cagno et al. | 710/110 |
| 2009/0106532 A1 | 4/2009 | Khan et al. | |
| 2009/0193169 A9 | 7/2009 | Guenter et al. | |
| 2010/0205326 A1* | 8/2010 | Deshpande et al. | 710/11 |
| 2011/0153899 A1 | 6/2011 | Aldereguia et al. | |

(Continued)

OTHER PUBLICATIONS

USB Descriptor, Beyond Logic, 2010, <http://www.beyondlogic.org/usbnutshell/usb5.shtml>.*

(Continued)

*Primary Examiner* — Brian Misiura
(74) *Attorney, Agent, or Firm* — Olive Law Group, PLLC

(57) ABSTRACT

Multi-channel universal serial bus (USB) to subrate channel systems and methods are disclosed. According to an aspect, a system includes a USB interface configured to communicatively connect to a computing device. The system may also include a multi-channel interface configured to communicatively connect to multiple subrate channels. Further, the system may include a controller configured to communicatively connect the subrate channels with the computing device via the USB interface. The controller may also be configured to communicate, to the computing device, connection specifications for the subrate channels.

19 Claims, 27 Drawing Sheets

(56) References Cited

U.S. PATENT DOCUMENTS

| | | |
|---|---|---|
| 2012/0054389 A1 | 3/2012 | Lee |
| 2015/0039788 A1* | 2/2015 | Dearing et al. ............... 710/18 |
| 2016/0103772 A1* | 4/2016 | Simmons ............... G06F 13/12 |
| | | 710/309 |

OTHER PUBLICATIONS

Design specs for FT2232H; Doc. No. FT_000061; FT2232H Dual High Speed USB to Multipurpose UART/FIFO IC; Version 2.21; Clearance No. FTDI#77; Future Technology Devices International, Ltd.; copyright 2012; 67 pages.

Design specs for FT2232H—Hi-Speed Dual USB UART/FIFO IC; Weblink: www.ftdichip.com/Products/ICs/FT2232H.htm; last accessed Aug. 28, 2013; Future Technology Devices International, Ltd.; 3 pages.

Signalyzer H2: USB to Dual Channel; Weblink: microcontrollershop.com/product_info.php?products_id=3813; last accessed Aug. 28, 2013; 4 pages.

USB to I2C Dongle; Weblink: idt.com/products/power-management/multi-channel-power-management-solutions-pmic-pmu/usb-bridgev2-eval-usb-i2c-dongle; last accessed Aug. 28, 2013; 1 page.

USB-ISS Multifunction USB Communications Module technical specification; weblink: www.robot-electronics.co.uk/htm/usb_iss_tech.htm; last accessed Aug. 28, 2013; 5 pages.

Purchase Order Sheet for Analog Devices—USB-SMBUS-CableZ—Dongles, USB to I2C, for Adm1062, Adm1069; weblink: file:///S:/Clients/IBM%20168/168-38%20(RPS920130123US1)/prior%20art/USB-SMBUS-CABLEZ%20-%20ANALOG%20DEVICES%20-%20DONGLES,%20USB%20TO%20I2C,%20FOR%20 ADM1062%20%20%20Newark.htm; last accessed Aug. 29, 2013.

Data Sheet for USB-to-I2C Interface Dongles, USB-SMBUS-CABLEZ, USB-5PSMBUS-CABLEZ, copyright 2008 by Analog Devices, Inc.; 4 pages.

Forum weblink: www.diyaudio.com/forums/pc-based/232185-diy-another-usb-multichannel-i2s-i2c.html; last accessed Aug. 28, 2013; 3 pages.

* cited by examiner

| Launch and Reset Register | 31 |
| Test Register |
| SDA Short Timer |
| SCL Short Timer |
| Short Time Limit Register |
| Maximum Stretch Register |
| Iteration Count Register |
| Loop Iteration Register |
| Polling Interval Register |
| Sent Count Register |
| Receive Count Register |
| Transmit Size Register |
| Receive Size Register |
| Slave Address Register |
| Transaction Control Register |
| Configuration Register |
| Mask Register |
| Status Register | 0 |

FIG. 16

MULTI-CHANNEL UNIVERSAL SERIAL BUS (USB) TO SUBRATE CHANNEL SYSTEMS

BACKGROUND

Field of the Invention

The present invention relates to computing adapters, and more specifically, to multi-channel USB to subrate channel systems.

Description of Related Art

Several protocols have been developed to allow low-speed peripheral devices to connect to computing devices or systems. For example, the inter-integrated circuit (I²C) bus, the serial peripheral interface (SPI) bus, the 1-wire bus, the UNI/O bus, and similar protocols might be used for such purposes. Any such bus may be referred to herein as a serial peripheral bus. Also, the terms "bus" and "protocol" refer to a component for connecting low-speed peripheral device to a computing device or system. Such low-speed peripheral devices may include electrically erasable programmable read-only memory (EEPROM) devices, memory chips, digital-to-analog or analog-to-digital converters, monitors, speakers, display screens, clocks, and other devices. A system management bus (SMBus) is an enhanced implementation of I²C and uses a two-wire bus used for low-bandwidth communications among components of a system, especially power related chips such as a laptop's rechargeable battery subsystem, as well as other components such as temperature sensors and lid switches.

A universal serial bus (USB) cable can provide an interface between a host computing device and one or more peripheral devices, such as mobile phones, personal digital assistants, and removable media drives. Such peripheral devices may also be referred to as slave devices or downstream devices. The host computing device, which may also be referred to as a master device or an upstream device, is typically a computer system such as a personal computer.

It is desired to provide improved USB to I²C adapters.

BRIEF SUMMARY

In accordance with one or more embodiments of the present invention, multi-channel USB to subrate channel systems and methods are provided. According to an aspect, a system includes a USB interface configured to communicatively connect to a computing device. The system also includes a multi-channel interface configured to communicatively connect to a plurality of subrate channels. Further, the system includes a controller configured to communicatively connect the subrate channels with the computing device via the USB interface. The controller is also configured to communicate, to the computing device, connection specifications for the subrate channels.

BRIEF DESCRIPTION OF THE SEVERAL VIEWS OF THE DRAWINGS

FIG. 16 is a diagram of an example endpoint ¾ memory map in accordance with embodiments of the present invention;

DETAILED DESCRIPTION

As described herein, there are various embodiments and aspects of the present invention. According to embodiments, the present invention is directed to multi-channel USB to subrate channel systems and associated methods.

Figure 1:
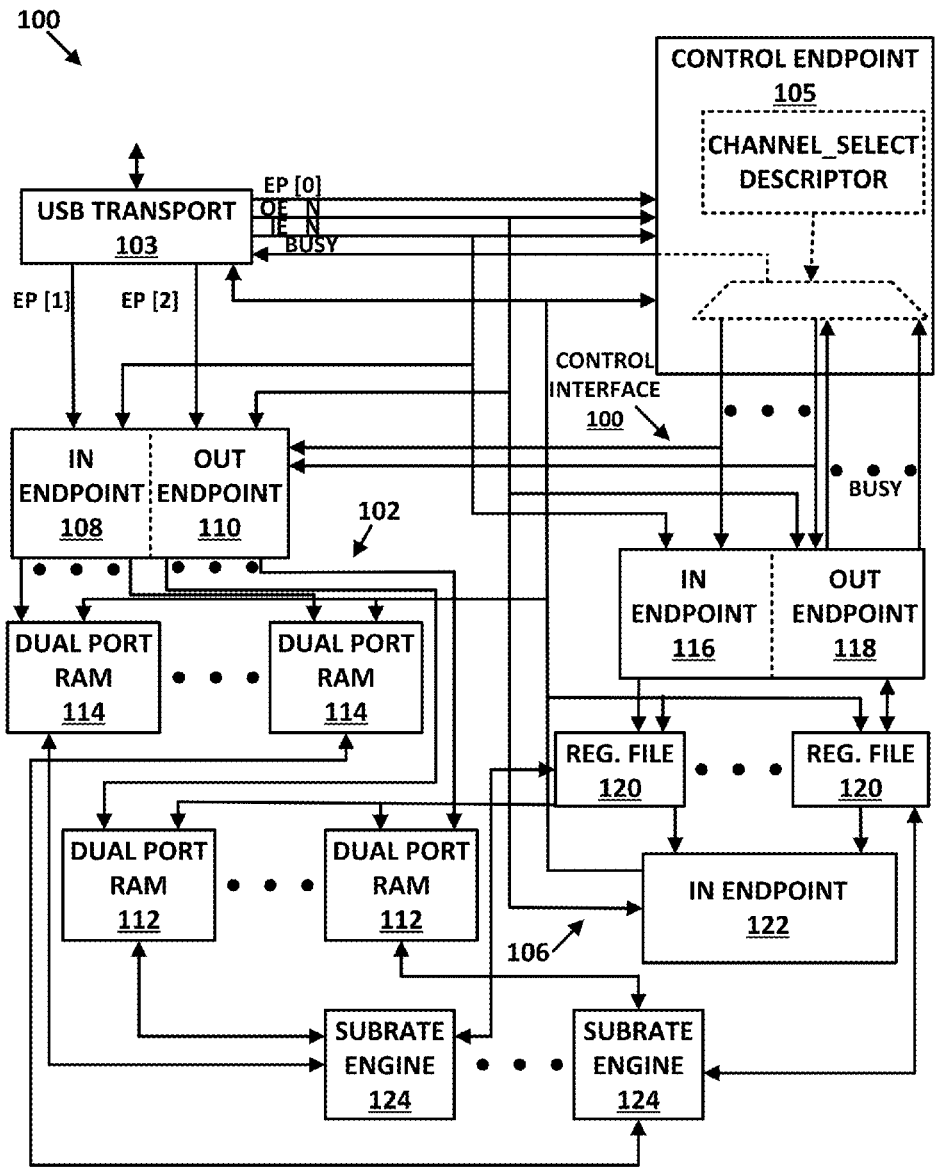
FIG. 1 is a block diagram of an example multi-channel USB to subrate channel system in accordance with embodiments of the present invention.

Referring now to FIG. 1, the figure illustrates a block diagram of an example multi-channel USB to subrate channel system 100 in accordance with embodiments of the present invention. The available bandwidth for USB enables it to be a transport medium for a multi-channel subrate subsystem for protocols, such as I²C, RS-232, RS-485, or the like. Many of the disclosed example systems and techniques describe use with I²C, but it should be understood that such systems and techniques may also be used with other suitable systems and protocols. The system 100 in this example can provide, but is not limited to, the following functionality: the system appears as a single unified USB device with one USB address; the system adheres to the device framework set forth in the USB specification; and the subsystem implements fully buffered individual subrate engines for each channel capable of autonomous operation concurrent with other channels.

The subsystem 100 may include a data interface generally designated 102 and functioning as part of a USB interface for communicatively connecting to a host computing device (not shown); a control interface generally designated 104 and functioning as part of a controller for connecting multiple subrate channels with the host computing device; and a status interface, generally designated 106. The data interface 102 may include an IN endpoint 108, an OUT endpoint 110, transmit buffers 112, and receive buffers 114. Each transmit buffer and each receive buffer may be associated with one subrate channel for buffering data to or data from the channel. The control interface 104 may include an IN endpoint 116, an OUT endpoint 118, and individual register files 120 for each subrate channel. The status interface 106 may include an interrupt IN endpoint 122 for reporting service requests from all channels during each interrupt. Further, the system 100 may include a USB transport layer interface 103 as part of the USB interface, and a control endpoint 105 as part of the controller. The USB transport layer interface 103 may be communicatively connected to a USB data link layer of the host computing device. The control endpoint 105 may be communicatively connected to the data interface 102, the control interface 104, and the status interface 106.

When the system 100 is connected to a host computing device, the computing device may request configuration information and device enumeration may begin. During device enumeration, a device connecting to the system 100 may return a descriptor as part of a descriptor configuration request. Enumeration, as referred to herein, may be a process of sending one or more commands and receiving data from the enumerated device to gather information about the device (e.g., device name, vendor identifier (VID), product identifier (PID), number of endpoints, required power, name of the company that manufactured the device, etc.). The descriptor configuration request is referred to herein as "GET_DESCRIPTOR_CONFIGURATION". An example returned descriptor, which may be referred to herein as "MULTI_CHANNEL_SUBRATE_CONTROLLER" descriptor, is shown in Table 1 below.

TABLE 1

Example MULTI-CHANNEL_SUBRATE_CONTROLLER Descriptor

| Offset | Field | Size | Value | Description |
| --- | --- | --- | --- | --- |
| 0 | bLength | 1 | Number | Size of this descriptor in bytes |
| 1 | bDescriptoType | 1 | Constant | MCSC Descriptor Type |
| 2 | bNumChannels | 1 | Constant | Number of Channels |
| 3 | bDataInterface | 1 | Number | Interface number of the data interface for this function |
| 4 | bControlInterface | 1 | Number | Interface number for the control (register) interface for this function |
| 5 | bStatusInterface | 1 | Number | Interface number for the status (interrupt) interface for this function |
| 6 | wTransmiBufferSize | 2 | Number | Size of transmit buffer for each channel |
| 8 | wReceiveBufferSize | 2 | Number | Size of receive buffer for each channel |
| 10 | bNumRegisters | 1 | Number | Number of control registers for each channel |
| 11 | bStatusSize | 1 | Number | Number of bytes returned for a status interrupt |
| 12 | bProtocol | 1 | Constant | Reserved for subrate protocol |

The controller of the system 100 may provide this descriptor to the host computing device for providing connection specifications for the subrate channels. The connection specifications may indicate the number of subrate channels, a subrate type, transmit buffer information, receive buffer information, register information, subrate protocol information, and other information. The bProtocol field may indicate subrate protocol information.

The system 100 must use an INTERFACE_ASSOCIATION descriptor in accordance with USB specification 2.0 and associate interfaces 102, 104, and 106 such that the interfaces may be managed by the same device driver.

The control and data interfaces 104 are controlled by the control endpoint 105 to select one of the subrate channels for connection with the host computing device via the USB interface. Channel selection is implemented by use of a SET_DESCRIPTOR_CHANNEL_SELECT descriptor request to write the descriptor, an example of which is shown in Table 2 below. The descriptor must be written to endpoint 0 prior to any read or write of data or the control interface.

TABLE 2

Example CHANNEL_SELECT Descriptor

| Offset | Field | Size | Value | Description |
| --- | --- | --- | --- | --- |
| 0 | bLength | 1 | Number | Size of this descriptor in bytes |
| 1 | bDescriptoType | 1 | Constant | Channel Select Descriptor Type |
| 2 | bmDirection | 1 | Bitmap | Bits 7:2 Reserved Bit 1 Reset Bit 0 Direction 0 = IN 1 = OUT |
| 3 | wLength | 2 | Count | Number of bytes to transfer in data stage |

TABLE 2-continued

Example CHANNEL_SELECT Descriptor

| Offset | Field | Size | Value | Description |
|---|---|---|---|---|
| 5 | bChannel | 1 | Number | Bits 6:0 Channel<br>Bit 7 (Data Interface only) Buffer Type<br>0 = Transmit Buffer<br>1 = Receive Buffer |

If a new CHANNEL_SELECT descriptor is not written prior to an attempted access to the data or the control interface, the device can return a protocol STALL. The control endpoint 105 may generate and communicate the CHANNEL_SELECT descriptor. bmDirection can indicate a direction of communication for the channel.

Figure 2:
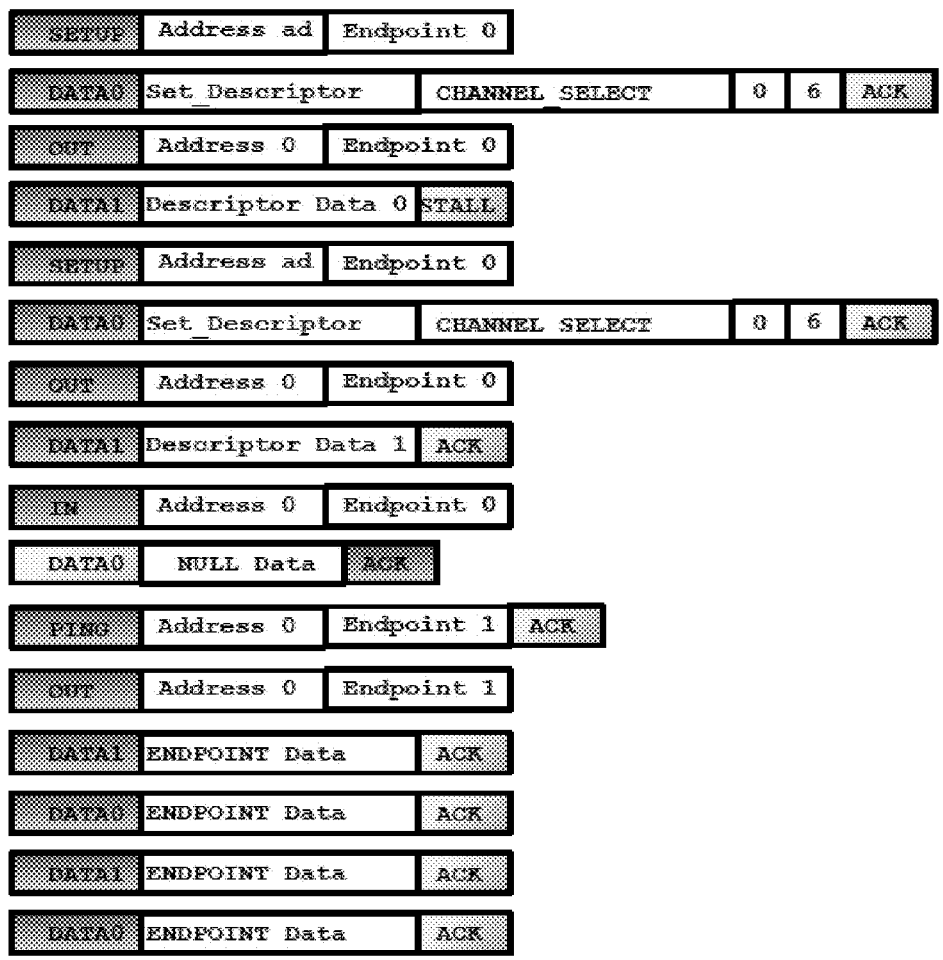
FIG. 2 is an example protocol flow in accordance with embodiments of the present invention.

The system 100 may include multiple subrate engines 124 that are each associated with one of the subrate channels. The subrate engines 124 may be communicatively connected to register files 120 and buffers 112 and 114. To prevent buffer or control writes from affecting a subrate engine 124 while conducting a transaction, any attempt to write the CHANNEL_SELECT descriptor with a bmDirection set to OUT to a busy channel can produce a protocol STALL. This is illustrated in FIG. 2, which illustrates an example protocol flow in accordance with embodiments of the present invention. Referring to FIG. 2, in the first attempt to set the CHANNEL_SELECT descriptor, the channel is busy, and the descriptor write results in a protocol STALL. On a second write, the channel is not busy, and the SET_DESCRIPTOR command and subsequent data transfers pass. The protocol begins with a control transfer operation to the control endpoint. A control transfer operation consists of a SETUP packet, followed by a DATA0 packet describing the transaction. Control endpoint standard device transactions use an eight byte packet for this purpose. Since this is a SET_DESCRIPTOR transaction to write the CHANNEL_SELECT descriptor this eight byte packet is formatted as follows:

| | | |
|---|---|---|
| bmRequestType | 1 byte | 00000000B |
| bRequest | 1 byte | SET_DESCRIPTOR |
| wValue | 2 bytes | CHANNEL_SELECT (upper byte)<br>00000000B (lower byte) |
| wIndex | 2 bytes | 0000000000000000B |
| wLength | 2 bytes | Descriptor Length (6) |

Following the setup, the control transfer then proceeds to the data phase if required. The data phase includes an IN or OUT packet followed by one or more DATAx packets. In the SET_DESCRIPTOR transaction for the CHANNEL_SELECT descriptor this is an OUT packet followed by a DATA1 packet containing the descriptor data. The multi-channel device processes this data instantly upon receipt and returns either a STALL if it rejects this setup, or an ACK packet if it accepts it. Following the data transfer phase, is the handshake phase of the control transfer. This is an instantaneous change of transfer direction, i.e. if there is no data phase or the data phase was an OUT transaction, the handshake begins with an IN packet. If the data phase was an IN transaction, the handshake phase begins with an OUT packet. The peripheral responds to an IN packet, or the host follows an OUT packet with a zero length DATAx packet. The other end then sends an ACK packet to complete the control transfer.

During high speed operation, USB specification 2.0 requires that the data and the control interface endpoints support the PING protocol to limit NAK responses. The PING protocol consists of a PING packet containing the peripheral address and endpoint number. If the peripheral can accept the maximum packet size on an OUT transaction, or can return the maximum packet size on an IN transaction, it will respond to the PING with an ACK packet. Since the multi-channel device may be non-blocking in nature, it can respond to the PING with an ACK packet provided that the CHANNEL_SELECT descriptor is valid. If the CHANNEL_SELECT descriptor is invalid, the device is not in a configured state, or the designated endpoint is halted, it will respond to the PING with a STALL packet. After a successful PING the host proceeds to perform the data transfer. To reduce logic, the maximum packet size in this case is limited to 64 bytes (the maximum packet size for Full Speed operation). Therefore, 4 separate data transactions are required to transfer 256 bytes.

In accordance with embodiments, the system 100 shown in FIG. 1 may be implemented as a 32 channel $I^2C$ system. The system may be scalable to any suitable number of channels. Each channel may include functions such as, but not limited to, auto-polling, auto-compare, and the like. Each channel on this device should have its own dedicated subrate engine 124. These engines obtain data to be transmitted from the transmit buffers 114, and place data received into the receive buffers 112. Comparison data is placed by the host into the receive buffers for use by the subrate control engines when used in an auto compare mode. In the auto compare mode, the subrate control engines will only pace failing data into the receive buffers. The data interface, consisting of an IN endpoint 108 and an OUT endpoint 110 serves as the host portal to the transmit and receive buffers.

The subrate control engine operation is directed by the settings within the register files 120. The control interface, consisting of an IN endpoint 116 and an OUT endpoint 118 serves as the host portal to the register files. Service requests from the subrate control engines are sent to the status interface 122 to be aggregated with service requests from all other subrate control engines. The control endpoint 105 contains the data for enumeration, the channel select descriptor, and a multiplexer for the busy status from all the subrate control engines, used when the bmDirection in the CHANNEL_SELECT descriptor is set to OUT.

The USB transport 103 handles the USB transport protocol for all endpoints. It also performs such functions as CRC generation and checking, and PID substitution to maintain correct data toggle state. The USB transport also is responsible for address generation and maintaining data transfer counts.

Figure 3:
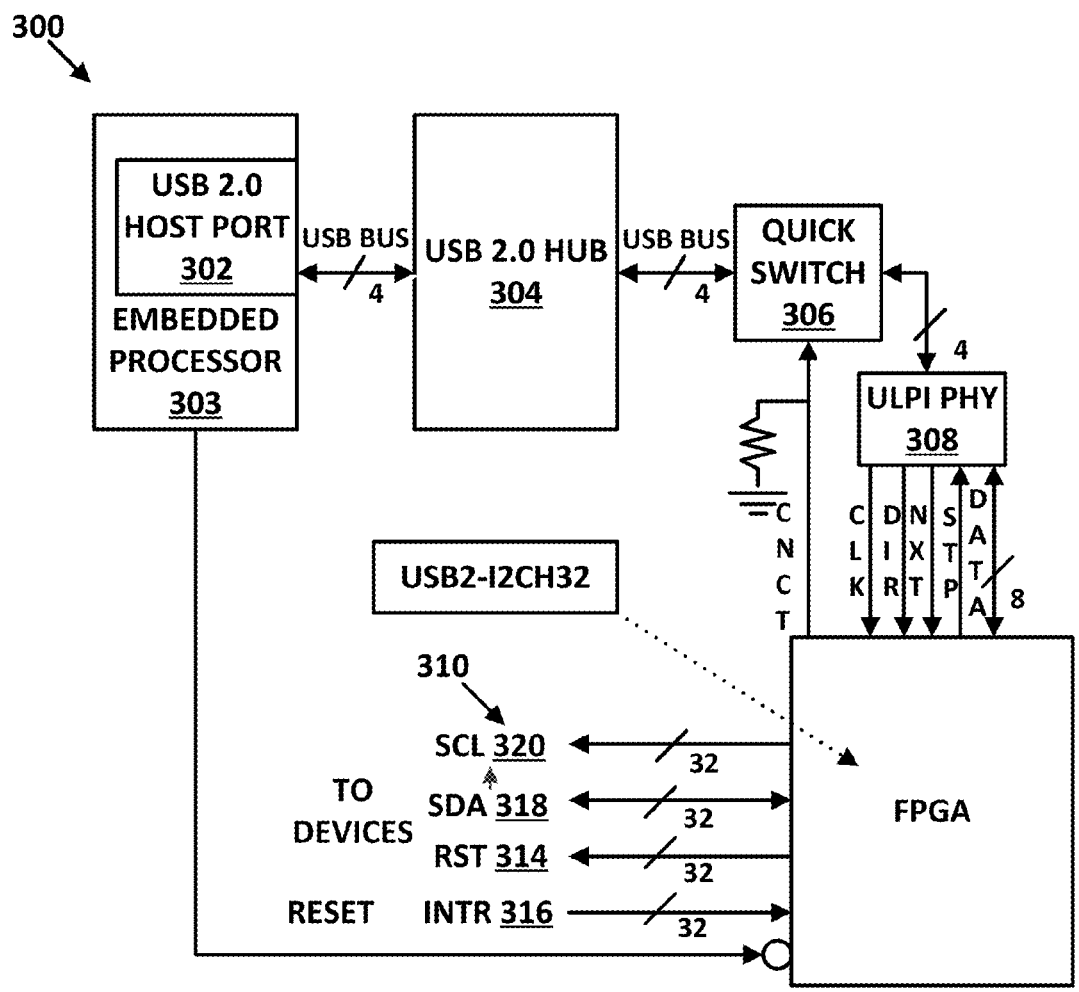
FIG. 3 is a block diagram of an example system that implements multi-channel USB to I²C functionality in accordance with embodiments of the present invention.

In accordance with embodiments of the present invention, systems disclosed herein may be scalable up to 32 $I^2C$ channels or any other suitable number of channels from a single USB slave device and can conduct unsupervised transactions once set up for one or more busses or channels is complete. For example, FIG. 3 illustrates a block diagram of an example system 300 that implements multi-channel USB to $I^2C$ functionality in accordance with embodiments of the present invention. The system 300 may provide an interface to a stand alone or embedded system via a USB high or full speed interface and may control up to 32 independent $I^2C$ or SMBus interfaces. The number of $I^2C$ channels may be scalable in order to achieve a desired price and performance. The system may operate as an $I^2C$ processing subsystem configured to operate the individual channels in a mostly unsupervised manner and alerting the host only when processing has been completed. Various features, such as auto-polling, transaction looping, and compare operations can allow the system to function independently until an event requiring the host's attention occurs. The system 300 may include multiple endpoints, USB interface control, I²C control, and I²C data. The system 300 may include a field programmable gate array (FPGA) or an application specific integrated circuit (ASIC). The system 300 can be located at a suitable distance from the host, such as on a server mid-plane, with a low number of host connections.

Referring to FIG. 3, the system 300 may serve as a bridge between a USB host 302 in a computing device having an embedded processor 303. Although cascaded hubs are allowed per USB specifications, operation of the system 300 may be through on intervening hub 304, a quick switch 306, a USB 2.0 Transceiver Macrocell Interface+(UTMI+) low pin interface (ULPI) PHY (or transceivers) 308, and I²C or SMBus compatible peripheral devices (not shown) residing on 32 independent I²C channels, generally designated 310. The system 300 may be alternatively configured to support cascading hubs. The channels 310 may be connected to an FPGA (or USB2I2CH32 device) 312 configured in accordance with embodiments of the present invention.

It is noted that USB specification version 2.0 defines a 480 megabit per second (Mb/s) transfer rate high speed (H/S) device option. Although H/S devices are capable of supporting the 12 Mb/s full speed (F/S) mode, due to limited speed, operation of the F/S mode may not be suitable. Further, it is noted that design for testability (DFT) rules generally dictate that devices have some manner of initiating the device to a known state, and for placing all output pins into a high impedance (3 state (high impedance un-driven)) condition to facilitate in-circuit testing. A system in accordance with the present invention may have at least one control pin for each of these functions.

The FPGA 312 (or USB2I2CH32 device) may include sixty four, 256 byte buffers. Half of the buffers may be configured as transmit buffers, that hold the data to be sent out on the I²C channels (or busses), and the other half may be configured as receive buffers, that either hold data received on the I²C channels for transmission back to the USB host 302, or in modes such as auto-polling, to hold the data for comparison to the data received on the I²C channels. Each I²C channel may have an individual transmit buffer and an individual receive buffer.

Although the transmit buffers can be used, from the USB host perspective, as write-only memory during normal device operation, all buffers may been setup as read/write memory to facilitate system diagnostics.

Each I²C channel, which may also be referred to as a bus, may have an associated active-low reset line 314 that allows all slave devices on that particular bus to be reset. The I²C bus state machine may itself be reset at any time by a separate active high bit in the launch reset register.

Each I²C bus may have an associated active-low interrupt line 316 to allow slave devices to signal a request for service. This reset may be enabled or disabled by a bit in transaction control register 0. If the interrupt is enabled and asserted, the host can have to conduct a polling operation to determine which device requires service and to reset the interrupt.

The SMBus specification and I²C mode devices can, in some cases, support a maximum data transfer rate of 100 Kilobits per second (Kb/s). The I²C specification also allows high speed devices, which support data transfer rates up to 400 Kb/s. Data transfer rates are dictated by SCL transitions. In order to accommodate SMBUS devices and standard mode I²C devices while not limiting the data transfer rate for high speed devices, the base frequency of SCL may be selectable, on a per bus basis, to either 100 or 400 Kilohertz (Khz).

The I²C channels may have associated signal data lines (SDLs) 318 and signal control lines (SCLs) 320. Both SDA and SCL may be open drain signals. SCL may be controlled primarily by the master, with a slave device able to sink it to less than 0.4 volts when it needs to request more time. This operation is known as clock stretching. SDA may initially be controlled by the master, but control may be transferred to the slave during read operations. An alternate master may also drive SDA low during arbitration. If either of these signals remain at a low level for an extended period of time, it may indicate a bus short, either a soft short, where a slave device is hung, or a hard short, where the bus is electrically shorted to logic ground. The period of time before a short is declared is programmable on a per bus basis. This period is also programmable for SDA and SCL, so they can have different values on the same bus.

Each bus can be individually configured to operate as an I²C master or slave device. While the bus is in the slave configuration, some of the registers may go unused and others are used in a different manner.

Each I²C bus may feature its own state machine to control operation. This means that every bus may operate without regard to what occurs on any other bus. Multiple I²C busses may be operated simultaneously.

An example transaction type is a read only transaction. During read only access, the slave device may be addressed from the slave address register with bit 0 forced to a logical one. One or more bytes of data may then be read from the slave device, with each byte, except for the last, acknowledged with an ACK pulse, and the last byte acknowledged with a negative acknowledge (NAK) pulse. Each received data byte is recorded in the receive buffer in sequential order, starting at location 0 during unary transactions, or after the last byte received during the first transaction during the second phase of compound transactions. If an error occurs during any phase of a read-only transaction, the transaction and any subsequent transaction may be terminated.

Another example transaction type is a compare only transaction. During compare only access, the slave device may be addressed from the slave address register with bit 0 forced to a logical one. One or more bytes of data can then read from the slave device, with each byte, except for the last, acknowledged with an ACK pulse, and the last byte acknowledged with a NAK pulse. Each received data byte can be compared with a byte from the receive buffer in sequential order, starting at location 0 during unary transactions, or after the last byte received during the first transaction during the second phase of compound transactions. During signal on mismatch modes, if the receive byte and the corresponding byte from the receive buffer do not match, the received byte can replace the corresponding byte in the receive buffer. The process can continue until all bytes specified for the transaction have been read and compared. All subsequent transaction may then be completed and a done flag may be then set. On signal on match modes, a mismatch is not recorded; however, a NAK pulse may be generated to the slave device to terminate the read, even if all specified for the transaction have not been read. If all bytes for the transaction match, all subsequent transactions are completed, and the done flag may be set. If an error occurs during any phase of a compare-only transaction, the transaction and any subsequent transaction is terminated.

During write only access, the slave device may be addressed from the slave address register with bit 0 forced to a logical zero. One or more bytes of data may then read from the transmit buffer in sequential order and written to the slave device. After the last byte is written, the host then sends a stop pulse. If at any point during the transaction the slave device does not send an ACK, the transaction and all subsequent transactions may be terminated and the error reported.

In read/write mode, the read transaction may be performed as described herein except that a stop pulse is not sent at the conclusion of the read. Instead, a restart is issued and a write transaction, similar to or the same as described herein is immediately performed.

During a compare/write transaction, a compare transaction, as described herein, may be performed. If the comparison is successful, a restart pulse, rather than a stop pulse may be issued, and a write transaction may be performed.

During a write/read transaction, a write transaction, as described herein, may performed, with the exception that a restart, rather than a stop pulse may be issued at the conclusion of the write, and a read transaction, as described herein, may then be conducted.

During write/compare transactions, a write transaction as described herein may be performed; however, at the conclusion of the write transaction, a restart, rather than a stop pulse may be issued, and then a compare operation as described herein may be conducted.

An auto-compare mode may be implemented to allow the host processor to be signaled with a done event only if the compare is successful, or a transaction fault occurs. Compare may be set for signal on match, or signal on mismatch and as described herein. Autocompare may be combined with auto-polling to conduct an unsupervised watchdog task.

Automatic polling may allow a set of I$^2$C transaction to be repeatedly conducted at predetermined intervals for allowing devices to be monitored without direct intervention from the host processor. A polling interval may be set at any suitable interval, such as between 100 milliseconds and 6553.6 seconds in 100 millisecond increments. At the conclusion of each polling operation, the transmit and receive buffer addresses may be automatically reset to zero.

Transaction looping may allow a transaction to be repeatedly executed a number of times. The number of iterations may be programmable from 1 to 256, or any other suitable numbers. The transmit and receive buffer pointers may start at the address following the previous repetition, allowing different data to be read/written on each loop. The conclusion of the last iteration, the transmit and receive buffer addresses may be reset to zero. Transaction looping can be used to poll an entire subsystem with a single setup.

A compound transaction may be a complex transaction where more than one I$^2$C base address is used. Compound transaction may be necessary for devices located behind an I$^2$C multiplexer, or for devices on multi-host I$^2$C busses. The FPGA 312 may support compound transaction using up to two I$^2$C base addresses.

Each bus, when used in the master mode, can be setup to retry failed I$^2$C transactions from one to three times, or any other suitable number of times. Automatic retry, as well as the number of retry attempts, may be programmable on a per bus basis. The interval between retry attempts may be programmable from 0 to 350 milliseconds in 50 millisecond increments or any other suitable configuration.

Figure 4A:
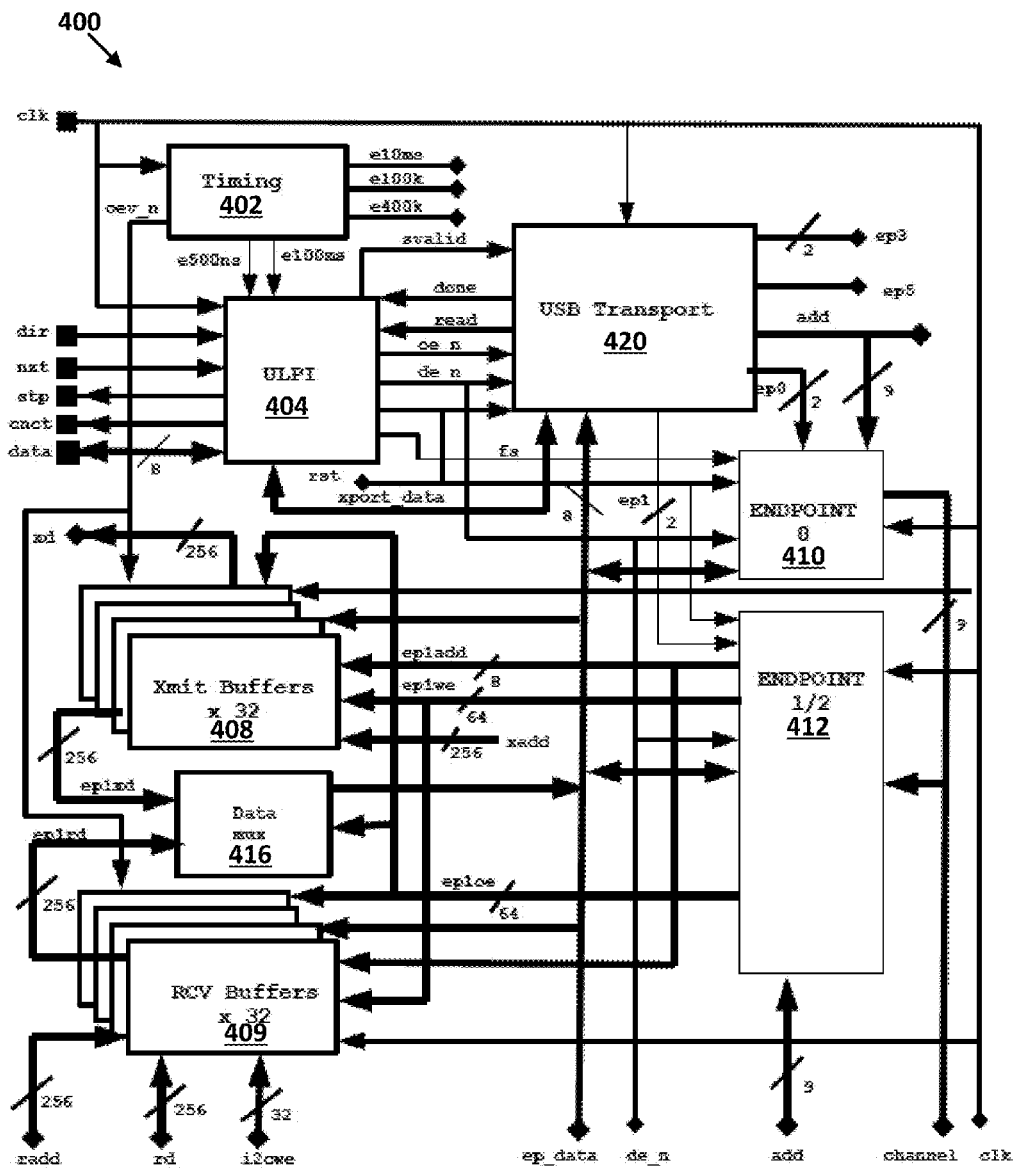
FIGS. 4A and 4B illustrate a block diagram of another example system that implements multi-channel USB to I²C functionality in accordance with embodiments of the present invention.
Figure 4B:
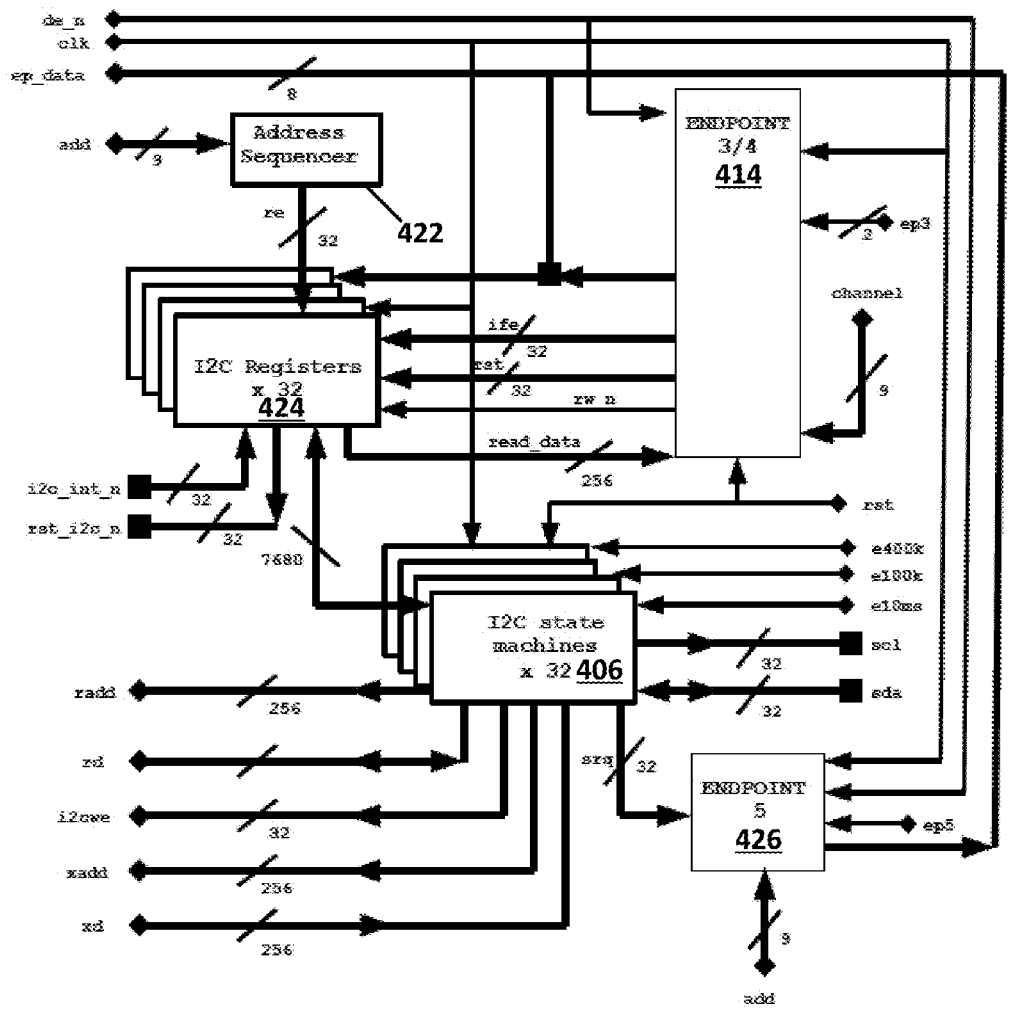
Figure 5:
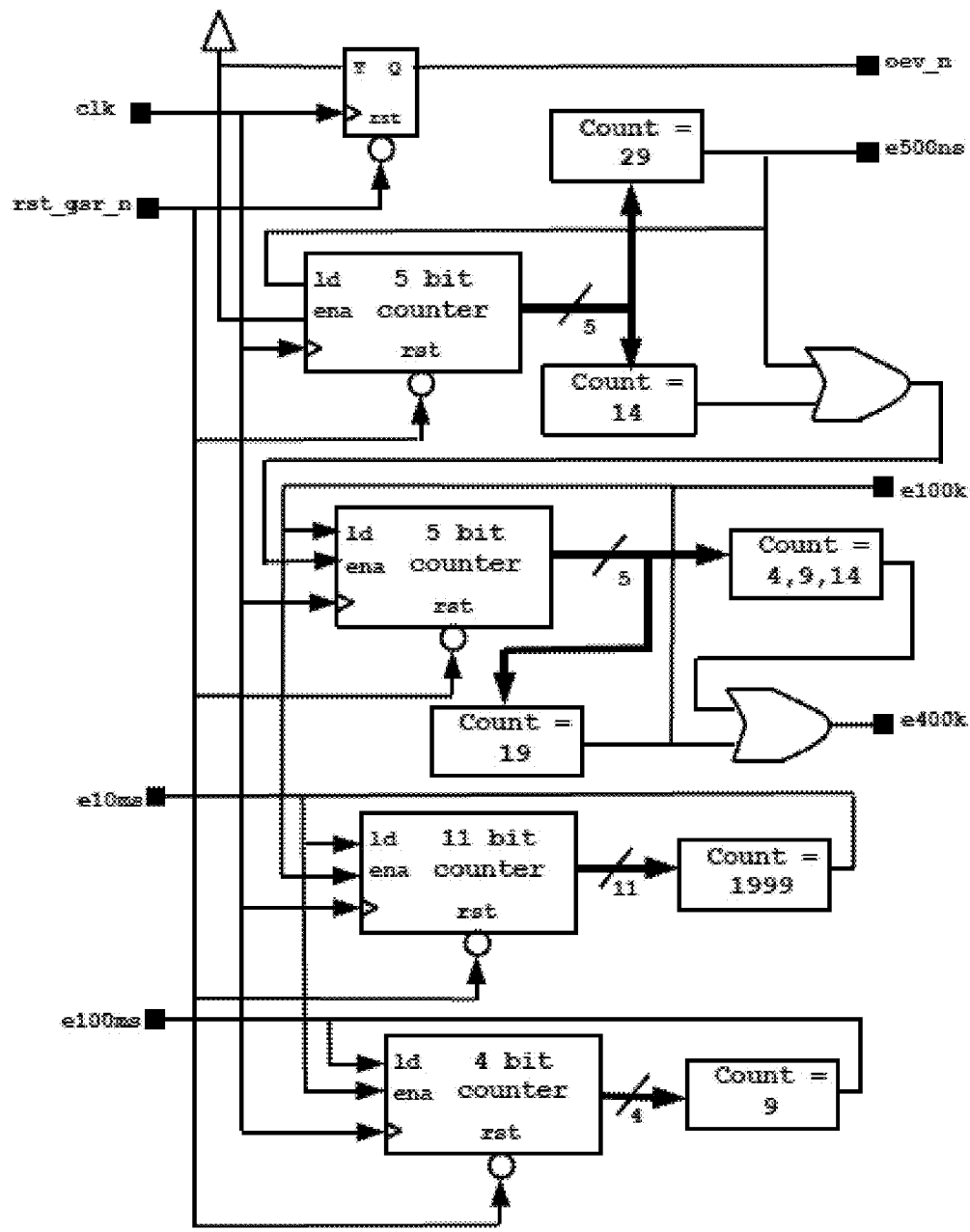
FIG. 5 is a block diagram depicting details of the timing module shown in FIG. 4A in accordance with embodiments of the present invention.

FIGS. 4A and 4B illustrates a block diagram of another example system 400 that implements multi-channel USB to I$^2$C functionality in accordance with embodiments of the present invention. Referring to FIGS. 4A and 4B, the system 400 may include a timing module 402 configured to control the timing of system functions by generating a set of clock enables from an input clock (e.g., a 60 megahertz input clock), using counters. Each enable may be active for a single clock cycle. Counters may be cascaded, as shown in FIG. 5, with each counter clock enable generated by the previous counter. The timing block 402 may also create a toggling multiplexer select signal, oev_n, that is active (high) for one clock cycle out of every two.

FIG. 5 illustrates a block diagram depicting details of the timing module 402 shown in FIG. 4A in accordance with embodiments of the present invention. Referring to FIG. 5, the e500 ns output may be used by an ULPI state machine 404 to time SE0 (i.e., a USB state, used to signal the beginning enumeration, where the USB host drives both D+ and D− to logic low while VBUS is valid) and to activate the chirp for high speed mode initialization. The e400k output may gate the clock edges for 400 kilohertz scl, and may be active once every 1.25 microseconds (2× data rate). The e100k output may gate the clock edges for 100 kilohertz scl, and may be active once every 5 microseconds (2× data rate). The e10 ms output may be used by the short detection logic in i2c state machines 406 to time scl and sda stuck low events, and may be active once every 10 milliseconds. The e100 ms output may be used by a soft disconnect timer in the ULPI block 404. The oev_n output may be used by the transmit and receive buffer blocks 408 and 409 shown in FIG. 4A to control access to random access memory (RAM) block halves.

Although a ULPI interface is not a requirement for USB operation, most FPGAs do not function at a high enough speed to handle USB directly. The ULPI interface provides a parallel data interface to an external PHY at one eight of the serial data rate. Referring now to FIGS. 4A and 4B, the ULPI block 404 may implement a state machine to control and monitor the external PHY. The ULPI block 404 may be driven by clk and controls data, command, and state information transfers by monitoring dir and nxt, and generating stp. Further, the ULPI block 404 may gate data between the PHY and the USB transport layer by monitoring done and controlling svalid, ie_n, oe_n and de_n. The ULPI state machine may generate data for TX commands and TX commands (NOPID) and may process RCV commands to determine line state and VBUS valid. The ULPI state machine may indicate connection speed to endpoint 0 by generating fs. The ULPI block 404 may generate cnct, which can control a quick switch to physically disconnect and connect the PHY to the USB bus.

Figure 6:
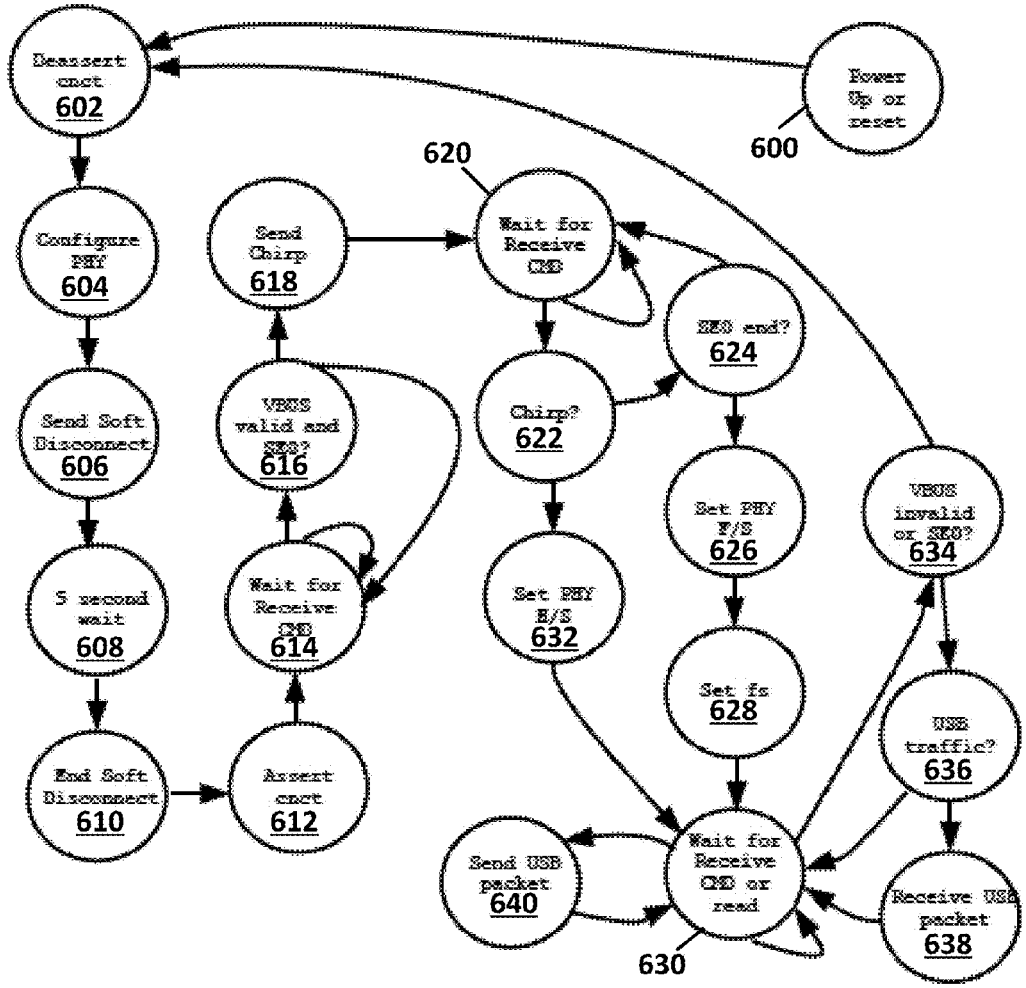
FIG. 6 is a diagram of an example ULPI state machine in accordance with embodiments of the present invention.

FIG. 6 illustrates a diagram of an example ULPI state machine in accordance with embodiments of the present invention. Referring to FIG. 6, the state machine may begin on power-up or reset 600. Subsequent to power-up or reset 600, the state machine may de-assert cnct 602 and generate a series of register write commands 604 to cause a soft disconnect 606, which it holds for 5 seconds 608 so that the USB host may detect the disconnect condition 614 and reinitialize the device driver. The state machine may then send a series of register write commands to reconnect as a full speed (FS) device (as per the USB specification5) and asserts cnct 612.

The ULPI block then waits 614 for the USB host to respond by sending a single-ended zero (SE0), as represented by the receipt of a RCV command from the PHY with VBUS valid 616 and both LINESTATE 0 and LINESTATE 1 at a logical zero. It must validate the SE0 condition for a minimum of 2.5 microseconds.

Once SE0 has been validated, the ULPI block sends register write commands to the PHY to set the transceiver select to H/S and the mode to chirp. It then sends a TX command (NOPID) to begin the chirp 618. It lets the chirp persist for 1 millisecond, and then sends another TX command (NOPID) to resume normal H/S signaling.

When the USB host detects the chirp 622 it responds by sending a series of chirps that must be at least 40 microseconds, and no more than 60 microseconds long. The ULPI must detect a minimum chirp of chirp K-J-K-J-K-J. Each individual K and J must be detected for a minimum of 2.5 microseconds. Once the minimum sequence is detected, the ULPI block sends register write commands to the PHY to change mode to H/S 632 and then waits to detect squelch from the host, in order to know when it has completed chirp. It then sets FS (a USB full speed device) to zero and svalid to 1.

If the ULPI block does not detect the host chirps in 100 microseconds, it sends register write commands to the PHY to set transceiver select to F/S 626 and activate the pullup resistors. It then sets both fs 628 and svalid to 1.

During normal operation the ULPI block monitors the PHY for RCV commands 630. It monitors LINESTATE and VBUS valid 634, and generates a reset to all other downstream devices in the event of a disconnect or SE0 condition. When it detects USB packets 636, it activates ie_n to forward them to the USB transport block. On USB read transactions 638, as indicated by read from the USB transport block asserted high, it waits for dir to go low. It then pauses for one clock cycle for bus turn around, and generates a TX command to send the USB data packet back 640. Finally, it de-asserts oe_n on the next clock. When done becomes asserted, the ULPI block will generate stp for one clock cycle to indicate data end.

The ULPI block throttles USB data into and out of the USB transport block and the endpoints by use of de_n. When de_n is high, current data is held on the next rising edge of clk. When de_n is low, the data can transition to next data on the next rising edge of clk.

The ULPI block also examines the state of VBUS valid and LINESTATE during every receive command. If it detects VBUS invalid or SE0, it will immediately de-assert svalid and return to the initialization routine.

The USB transport block may implement a state machine and other hardware necessary to receive USB packets, perform error checking, activate endpoints, and control the flow of data between the endpoints and the ULPI interface block. It may include crc generator/checkers to check endpoint address fields in tokens and write data and to provide a check for read data. Further, it may include decode hardware to identify the various USB packet types and react accordingly. It may maintain data toggle synchronization via a PIDsubstitution mechanism. The USB transport block requires svalid from the ULPI interface block be active before it can respond to USB packets.

The USB transport block may be responsible for management of the USB transport layer protocol, creation of all handshake packets, and the addition of the crc to all data packets for the bulk and interrupt endpoints. It may activate the appropriate IN or OUT endpoints based on the token, monitors handshake packets from the host and maintains the data transfer counts, address pointers, and data toggle synchronization. It also buffers all SETUP data packets and processes all standard device requests.

Referring now to FIGS. 4A and 4B, ENDPOINT 0 410 may include a set of standard USB Descriptors which describe the device to the host. ENDPOINT 0 410 may contain descriptors for DEVICE, DEVICE_QUALIFIER, CONFIGURATION, INTERFACE ASSOCIATION, INTERFACE, ENDPOINT, OTHER_SPEED_CONFIGURATION, and 2 STRING descriptors for Manufacturer Name, and Product Name. It may also contain two, vendor specific descriptors for management of the other endpoints.

Static data for ENDPOINT 0 410 may be maintained in a ROM. Dynamic data is stored in a set of registers. A set of multiplexers, controlled by the current address, selects between the two during the GET_DESCRIPTOR and SET_DESCRIPTOR commands.

ENDPOINT ½ 412 may be 2 bulk data endpoints, one IN, and one OUT, for transferring data into and out of the transmit and receive buffers. It may rely on a value from a vendor specific descriptor in ENDPOINT 0 410 to select the appropriate buffer, either via its write enable, or via the output enable to the data multiplexer (mux). The buffer addresses are maintained by the address pointer in the USB transport layer.

Write access to any buffer in ENDPOINT ½ 412 blocked if the corresponding channel in ENDPOINT ¾ 414 is in a busy state. Any write access attempted to those buffers during this period can result in a STALL response.

Figure 7:
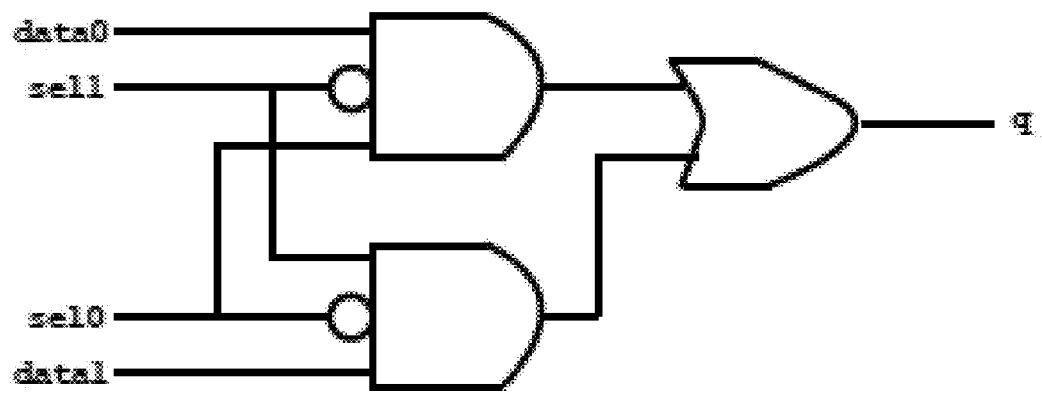
FIG. 7 is a diagram of an example of enhanced multiplexer logic and output results in accordance with embodiments of the present invention.

The data multiplexer block 416 selects buffer data to be read by the USB interface. It can be a 512×8 bit multiplexer, employing enhanced multiplexer functions that feature dual select inputs, to allow data selection in just 4 logic levels with a minimum number of logic blocks. Since most modern FPGA devices are based upon 4 input logic cells, using enhanced multiplexer logic on the first level allows selection between one of two data inputs or nothing, based on the select inputs. FIG. 7 illustrates a diagram of an example of enhanced multiplexer logic and output results in accordance with embodiments of the present invention.

Each byte from one of two sources requires 8 such cells, grouped into blocks. Each set of four enhanced multiplexer blocks feed one of 16 logical OR blocks on the next level. Each set of four logical OR blocks then serve as inputs to one of four logical OR blocks on the third level, which in turn serve as inputs to a logical OR block on the final level.

The transmit buffers 408 can be 32 256 byte dual port RAMS that connect between the USB 420 and the I²C state machines 406. The I²C access port (port 2) may be read-only, and the USB port is read/write. In order to implement in typical FPGA architectures, which have 4096 bit RAM blocks, 2 transmit buffers can be placed in each block. This requires that a multiplexer be used on port two, to allow access by either of two I²C state machines. The multiplexer can shift port 2 address on each clock cycle, alternating access between state machines. The T flip-flop7 used to toggle between the two addresses also generates the ninth address bit for port 2.

Figure 8:
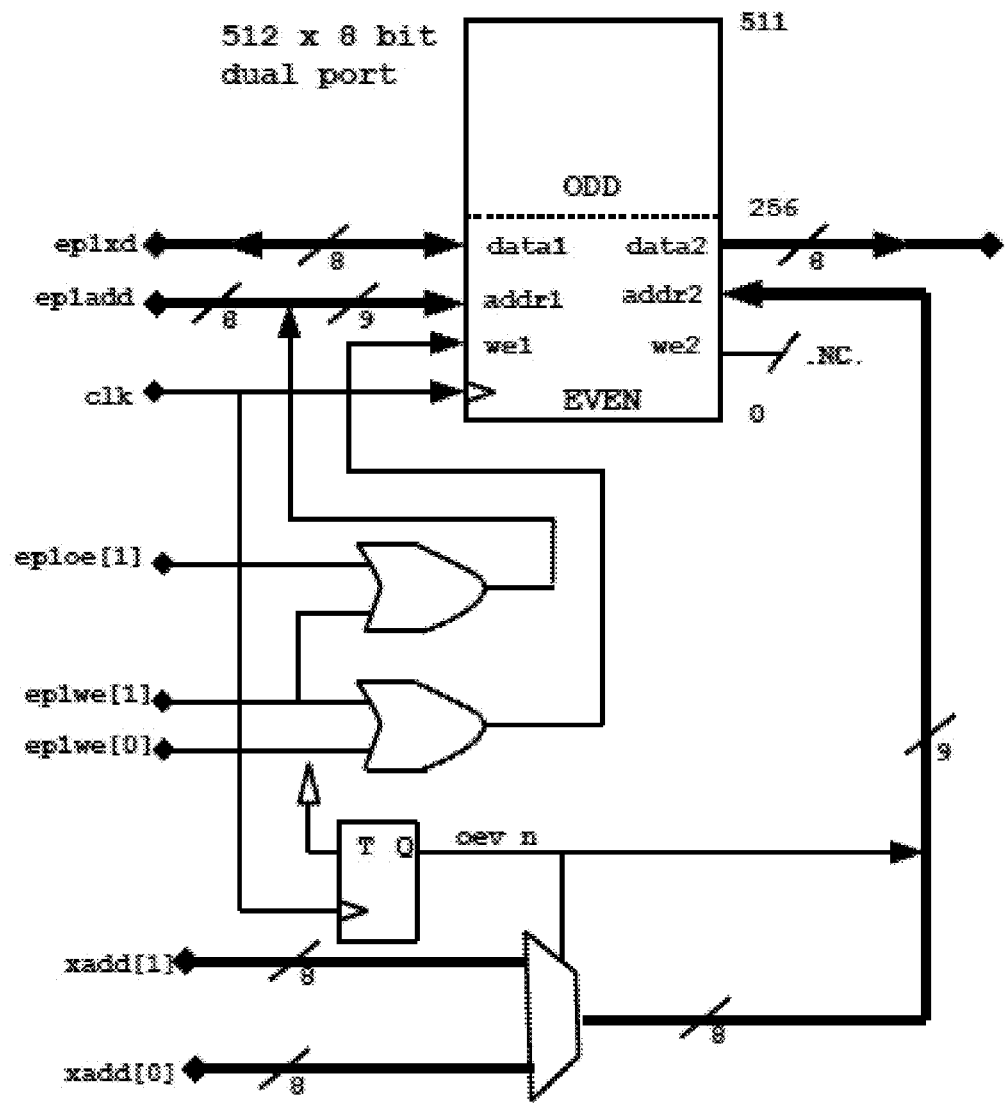
FIG. 8 is a diagram of an example transmit buffer in accordance with embodiments of the present invention.

The transmit port also has special requirements. The write enables from each even odd pair have to be combined, and a ninth address bit generated. The write enable for the odd buffer is combined with the output enable for the odd buffer to generate this bit. FIG. 8 illustrates a diagram of an example transmit buffer in accordance with embodiments of the present invention.

Figure 9:
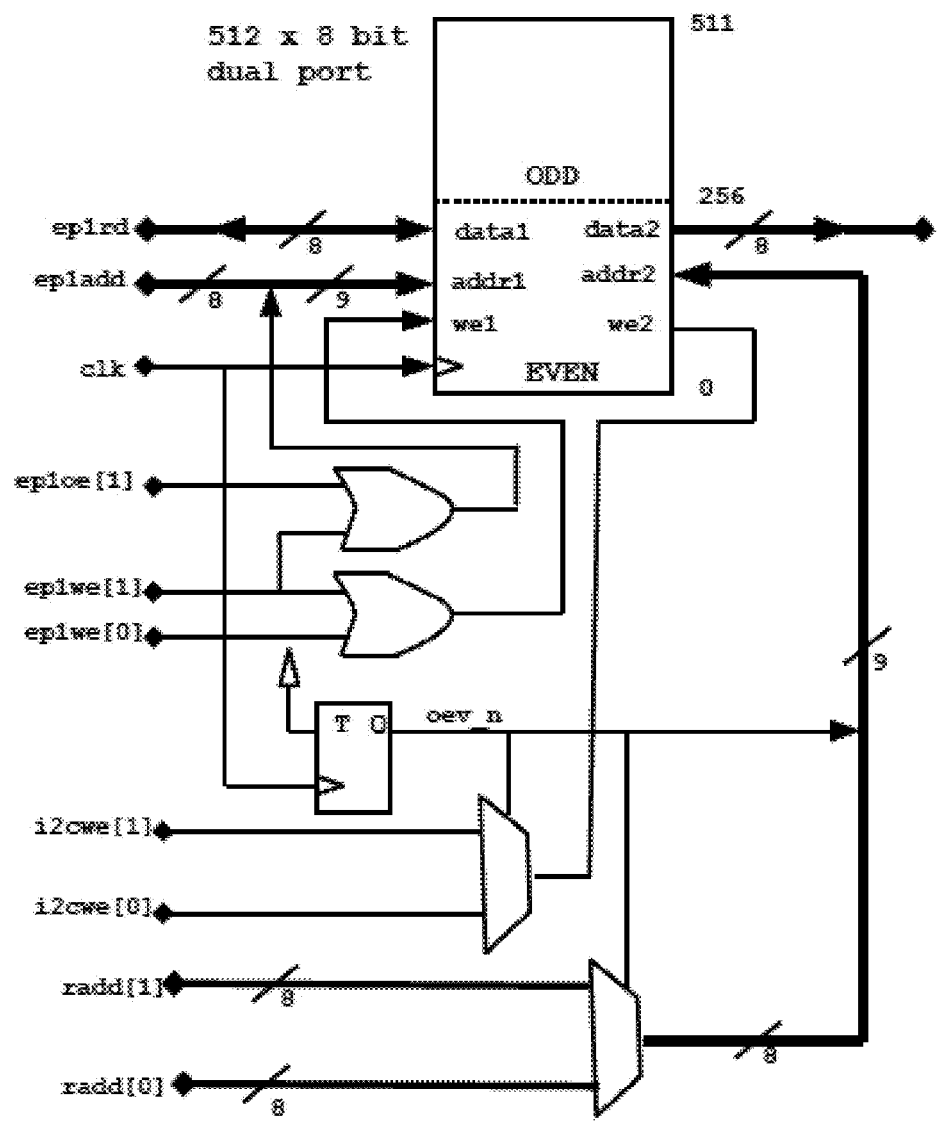
FIG. 9 is a diagram of an example receive buffer in accordance with embodiments of the present invention.

The receive buffers 409 are used to hold the data received from the I²C links, or to hold comparison data when the associated I²C link is performing auto-polling. They are almost identical to transmit buffers, with the exception that port 2 is a read/write port also, requiring an additional multiplexer for the I²C write enables. FIG. 9 illustrates a diagram of an example receive buffer in accordance with embodiments of the present invention.

Endpoint ¾ 414 may include a pair of bulk data endpoints, one IN and one OUT. The entire register file for a particular channel may be read from or written to as a single group. The register file for a channel may only be written when that channel is idle. Any attempt to write to the register file while the channel is busy will return a STALL response.

Figure 10:
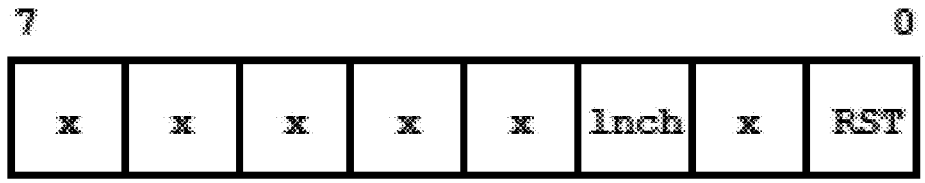
FIG. 10 is a diagram of an example launch and reset register in accordance with embodiments of the present invention.

The system 400 may include an address sequencer 422 that receives the address from the USB transport layer 420 and translates it into 32 individual register enables. The system 400 includes I²C registers 424 that may be a set of 32 register files to control the operation and report the status of the I²C state machines. Each register file is structured in big endian format. The launch and reset register may be a write only register that sets the particular interface to its default conditions when a one is written to bit 0 or launches the defined I²C transaction when a one is written to bit 2. It may not be masked out. Write access is always permitted. FIG. 10 illustrates a diagram of an example launch and reset register in accordance with embodiments of the present invention.

Figure 11:
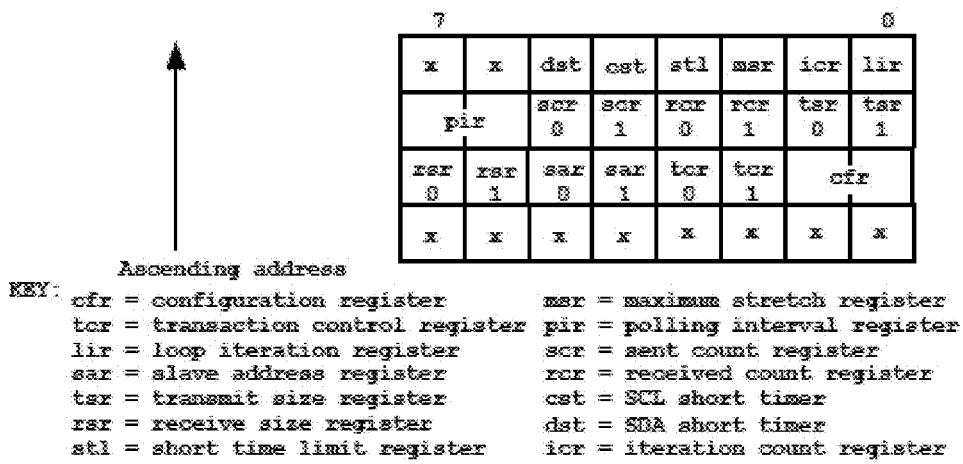
FIG. 11 is a diagram and information of an example mask register in accordance with embodiments of the present invention.

The mask register may be used to prevent write access to registers. Upon initialization, all registers in the file, except the status register, test register, and the launch and reset register, have read/write access. When the corresponding bit in the mask register is set, write access to that register byte is blocked. The mask register may not be masked out. Write access is always permitted. FIG. 11 illustrates a diagram and information of an example mask register in accordance with embodiments of the present invention.

Figure 12:
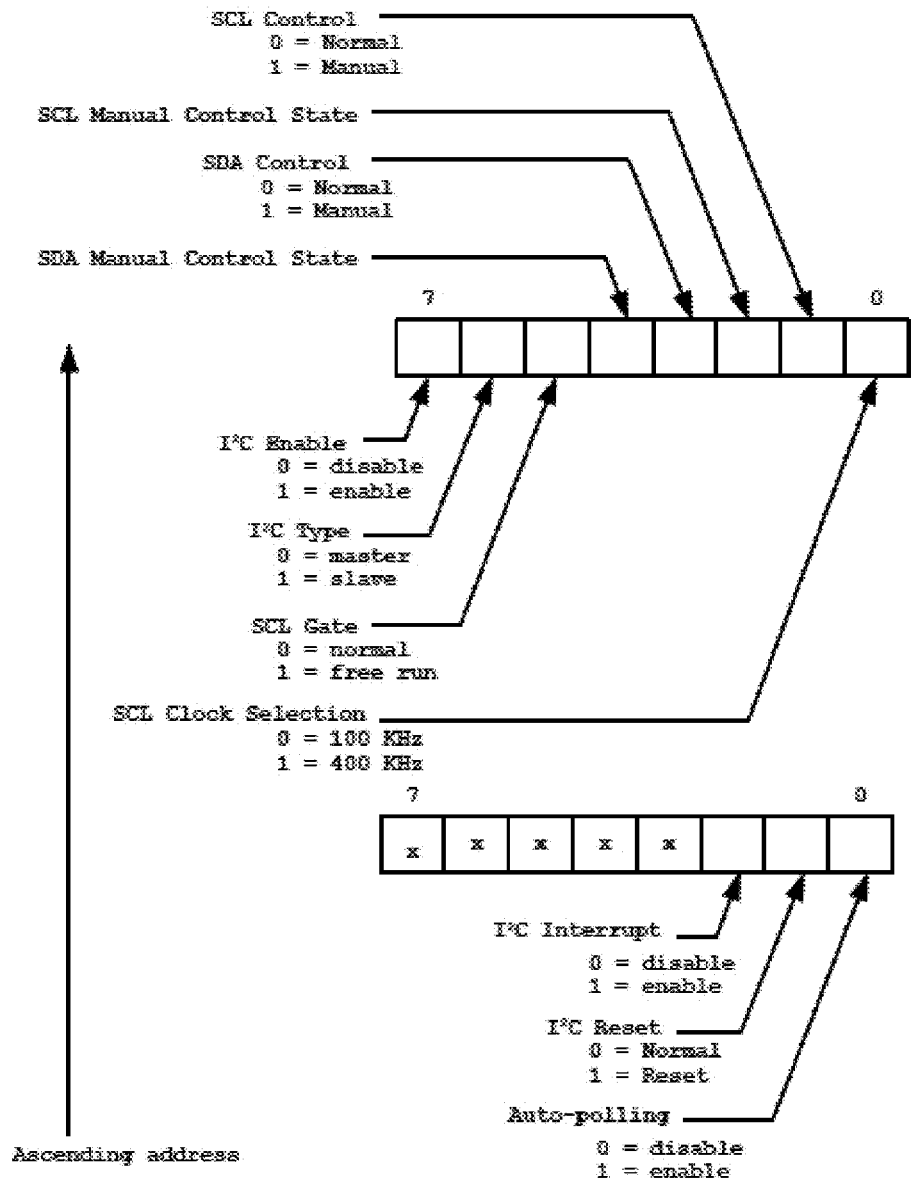
FIG. 12 is a diagram of an example configuration register in accordance with embodiments of the present invention.

The configuration register may be used to enable the I²C host state machine, set the clock speed, choose between master or slave operation, setup auto-polling, enable or disable the I²C interrupt, control the I²C peripheral reset, and to manually adjust the states of SDA and SCL for testing. It also contains an SCL gate which is used in conjunction with manual control of SDA to initialize all devices on that particular I²C bus by ensuring that any in progress transactions have been completed. SDA is manually set high and SCL gate is set to free run briefly. This ensures that all peripheral transactions have been completed, and the bus is idle. FIG. 12 illustrates a diagram of an example configuration register in accordance with embodiments of the present invention.

Figure 13:
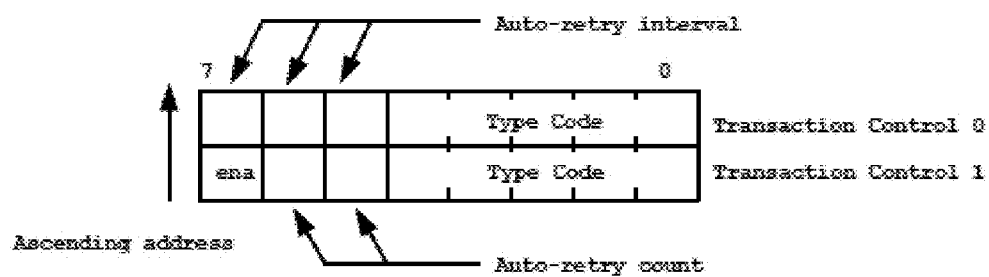
FIG. 13 is a diagram of an example transaction control register in accordance with embodiments of the present invention.

The transaction control register is used only in the master mode to setup and start the current I²C transaction and define auto-retry. The least significant byte (LSB) is used for the first, or only transaction, and to define the auto-retry interval in 50 millisecond increments. The most significant byte (MSB) is used for compound transactions to define and enable the second transaction; and to setup the number of auto-retry attempts. FIG. 13 illustrates a diagram of an example transaction control register in accordance with embodiments of the present invention. Table 3 below shows example transaction codes for the register.

TABLE 3

Example Transaction Code Types

| Code | Transaction |
| --- | --- |
| 5'b00000 | No Transaction |
| 5'b00001 | Read Only |
| 5'b00010 | Write Only |
| 5'b00011 | Read/Write |
| 5'b00100 | Compare Only, Signal on match |
| 5'b00101 | Compare Only, Signal on mismatch |
| 5'b00110 | Compare/Write, Signal on match |

TABLE 3-continued

Example Transaction Code Types

| Code | Transaction |
| --- | --- |
| 5'b00111 | Compare/Write, Signal on mismatch |
| 5'b01000 | Reserved |
| 5'b01001 | Write/Read |
| 5'b01010 | Reserved |
| 5'b01011 | Reserved |
| 5'b01100 | Write/Compare, Signal on match |
| 5'b01101 | Write/Compare, Signal on mismatch |
| >=5'b01110 | Reserved |

The loop iteration register may set the number of times (minus 1) to repeat the defined transactions. It may only be used in the master mode.

Figure 14:
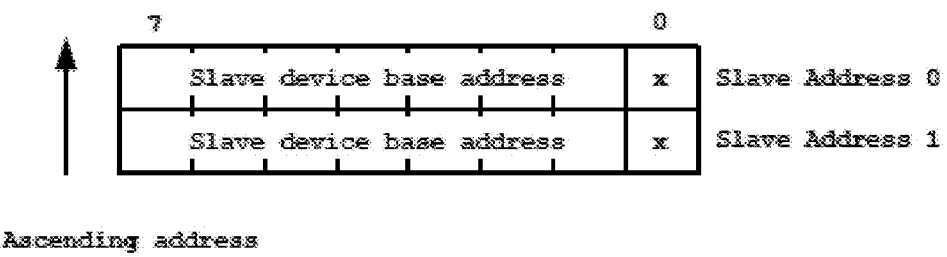
FIG. 14 is a diagram of an example slave address register in accordance with embodiments of the present invention.

The slave address register may include the I²C peripheral device address in bits 7-1 of the LSB. Bit zero is unused and should be set to zero. The second byte of the slave address register is used during compound transactions to hold the base address of the second peripheral device, and contains the I²C peripheral device address in bits 7-1. Bit zero is unused and should be set to zero. When used in the slave mode the slave address register defines the I²C addresses that it can be recognized. FIG. 14 illustrates a diagram of an example slave address register in accordance with embodiments of the present invention.

The transmit size register, used only in the master mode, may contain the number of bytes to transmit during the first, or only, transmit transaction in the LSB. The MSB of the transmit size register is used during compound transaction and holds the number of bytes to transmit in the second transaction. The total of the two transmit size bytes cannot exceed 256.

The receive size register, used only in the master mode, contains the number of bytes to receive during the first, or only, receive or compare transaction in the LSB. The MSB of the receive size register is used during compound transactions and holds the number of bytes to receive during the second receive or compare transaction. The total of the two receive size bytes may not exceed 256.

The short time limit register contains the time, in tens of milliseconds, for the SCL and SDA short detector to operate.

The maximum stretch register contains the maximum time that SCL has been held low since this register was last reset or re-written by the USB host. It allows fine tuning of the Short Time Limit Register.

The polling interval register sets the interval, in hundreds of milliseconds, for autopolling.

The sent count register may contain the number of bytes sent by the I2C host state machine during the current transaction. The LSB is used by the first, or only, transmit transaction. The MSB is used for compound transactions and contains the number of bytes sent for the second transmit transaction.

The receive count register contains the number of bytes received by the I²C host state machine during the current transaction. The LSB contains the number of bytes received during the first, or only, receive transaction. The MSB is used during compound transactions and contains the number of bytes received during the second receive transaction. The short timer contains the current elapsed time, in tens of milliseconds, that SCL has been held low. The short timer contains the current elapsed time, in tens of milliseconds, that SDA has been held low.

Figure 15:
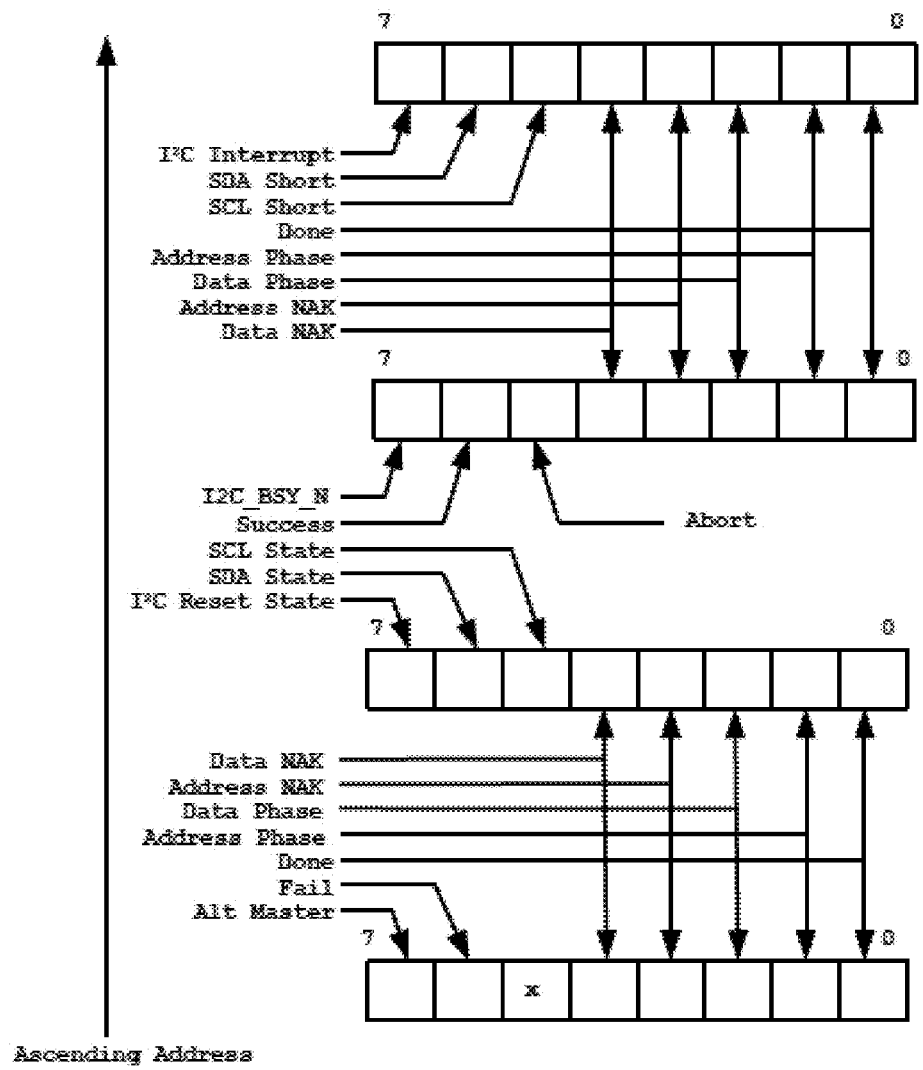
FIG. 15 is a diagram of an example status registers in accordance with embodiments of the present invention.

The status register may be a read only register that contains the current status of the associated I²C host state machine. FIG. 15 illustrates a diagram of an example status registers in accordance with embodiments of the present invention. The status register may report the status of the I²C interrupt line. The least significant word contains the status from the first, or only transaction and the interrupt status. The most significant word is used for compound transactions and contains the status from the second transaction. The stopped bit of the status register zero controls write access to the other registers in the file. Registers may not be written unless the stopped bit is set.

The I2C_BSY_N bit may get set when the transaction is stopped for any reason, whether for completion, error, or in compare operations when the compare is unsuccessful. The success bit becomes set when the entire transaction is successfully completed. For compare transactions, this includes the compare criteria for signaling to be met. During transaction looping, the status register contains the status from the final transaction executed. The success bit may not be set until the loop iteration register and the iteration count register match. The abort bit is set by a reset to an executing bus. Since some transactions may have both a write phase, and a read or compare phase, as many as four transactions have to be recorded. Address or data negative acknowledge (NAK) is recorded in a separate bit for each phase. The done bit for each phase only gets set if that phase has been successfully completed. SDA and SCL shorts are separately recorded, as is the state of the I²C interrupt. If a transaction fails, the failing phase can easily be detected by examining the NAK and done bits for each phase.

The iteration count register may be used only during transaction looping and contains the current iteration number minus 1.

The test register does not affect operation or report status of the I²C interface in any way. It is used by the USB for endpoint operational verification only.

The register memory map for endpoint 2 is setup to prevent unaligned accesses to any register and to write to the Launch and Reset register last so that launch delay circuitry is unnecessary. FIG. 16 illustrates a diagram of an example endpoint ¾ memory map in accordance with embodiments of the present invention.

The I²C state machines 406 may implement the I²C functions programmed into the I²C registers. They read data from the transmit buffers during send transaction, and either write data to the receive buffers, for standard transaction, or compare the current received data with the data in the receive buffer during auto-polling. They also implement compound transactions. Compound transactions are usually used to access a peripheral device behind an I²C multiplexer, or to access a shared I²C bus. Compound transactions require two different peripheral base addresses. Compound transactions are supported as long as the total transmit size to both peripherals does not exceed 256 bytes, and the total read or compare size from both peripherals does not exceed 256 bytes.

Endpoint 5 426 shown in FIG. 4B is an interrupt endpoint. It may be polled, for example, at 20 millisecond intervals is the F/S mode or 2 millisecond intervals in the H/S mode. It can return multiples of 16 bits of data, based upon the number of I²C interfaces, containing the service request data for each of the I²C busses. Each bit of the returned date reflects a service request from the corresponding I²C bus. Service requests may be posted for I²C interrupt, transaction completion, SDA, and SCL shorts, and buffer underflow or overflow conditions for busses operating in the slave mode.

Table 4 below illustrates example FPGA input/output (I/O) pin descriptions. For example, the I/O pins may be for FPGA 312 shown in FIG. 3.

TABLE 4

I/O Pin Descriptions

| Num | Name | Dir | Type | Act | Function |
|---|---|---|---|---|---|
| 1 | gts_n | I | LVTTL | L | Global 3-state enable |
| 2 | rst_gsr_n | I | LVTTL | L | Global reset |
| 3 | clk | I | LVTTL | H | 60 MHz clock from PHY |
| 4 | dir | I | LVTTL | H | ULPI data direction |
| 5 | nxt | I | LVTTL | H | ULPI data throttle |
| 6 | stp_pad | IO | LVTTL | H | Stop ULPI data transfer or signal last byte of transfer |
| 7 | data_pad[0] | IO | LVTTL | H | Least significant ULPI data bit |
| 8 | data_pad[1] | IO | LVTTL | H | ULPI data bit 1 |
| 9 | data_pad[2] | IO | LVTTL | H | ULPI data bit 2 |
| 10 | data_pad[3] | IO | LVTTL | H | ULPI data bit 3 |
| 11 | data_pad[4] | IO | LVTTL | H | ULPI data bit 4 |
| 12 | data_pad[5] | IO | LVTTL | H | ULPI data bit 5 |
| 13 | data_pad[6] | IO | LVTTL | H | ULPI data bit 6 |
| 14 | data_pad[7] | IO | LVTTL | H | Most significant ULPI data bit |
| 15 | rst_i2c_n_pad[0] | O | OC | L | Reset for I²C bus 0 |
| 16 | rst_i2c_n_pad[1] | O | OC | L | Reset for I²C bus 1 |
| 17 | rst_i2c_n_pad[2] | O | OC | L | Reset for I²C bus 2 |
| 18 | rst_i2c_n_pad[3] | O | OC | L | Reset for I²C bus 3 |
| 19 | rst_i2c_n_pad[4] | O | OC | L | Reset for I²C bus 4 |
| 20 | rst_i2c_n_pad[5] | O | OC | L | Reset for I²C bus 5 |
| 21 | rst_i2c_n_pad[6] | O | OC | L | Reset for I²C bus 6 |
| 22 | rst_i2c_n_pad[7] | O | OC | L | Reset for I²C bus 7 |
| 23 | rst_i2c_n_pad[8] | O | OC | L | Reset for I²C bus 8 |
| 24 | rst_i2c_n_pad[9] | O | OC | L | Reset for I²C bus 9 |
| 25 | rst_i2c_n_pad[10] | O | OC | L | Reset for I²C bus 10 |
| 26 | rst_i2c_n_pad[11] | O | OC | L | Reset for I²C bus 11 |
| 27 | rst_i2c_n_pad[12] | O | OC | L | Reset for I²C bus 12 |
| 28 | rst_i2c_n_pad[13] | O | OC | L | Reset for I²C bus 13 |
| 29 | rst_i2c_n_pad[14] | O | OC | L | Reset for I²C bus 14 |
| 30 | rst_i2c_n_pad[15] | O | OC | L | Reset for I²C bus 15 |
| 31 | rst_i2c_n_pad[16] | O | OC | L | Reset for I²C bus 16 |
| 32 | rst_i2c_n_pad[17] | O | OC | L | Reset for I²C bus 17 |

TABLE 4-continued

I/O Pin Descriptions

| Num | Name | Dir | Type | Act | Function |
|---|---|---|---|---|---|
| 33 | rst_i2c_n_pad[18] | O | OC | L | Reset for I$^2$C bus 18 |
| 34 | rst_i2c_n_pad[19] | O | OC | L | Reset for I$^2$C bus 19 |
| 35 | rst_i2c_n_pad[20] | O | OC | L | Reset for I$^2$C bus 20 |
| 36 | rst_i2c_n_pad[21] | O | OC | L | Reset for I$^2$C bus 21 |
| 37 | rst_i2c_n_pad[22] | O | OC | L | Reset for I$^2$C bus 22 |
| 38 | rst_i2c_n_pad[23] | O | OC | L | Reset for I$^2$C bus 23 |
| 39 | rst_i2c_n_pad[24] | O | OC | L | Reset for I$^2$C bus 24 |
| 40 | rst_i2c_n_pad[25] | O | OC | L | Reset for I$^2$C bus 25 |
| 41 | rst_i2c_n_pad[26] | O | OC | L | Reset for I$^2$C bus 26 |
| 42 | rst_i2c_n_pad[27] | O | OC | L | Reset for I$^2$C bus 27 |
| 43 | rst_i2c_n_pad[28] | O | OC | L | Reset for I$^2$C bus 28 |
| 44 | rst_i2c_n_pad[29] | O | OC | L | Reset for I$^2$C bus 29 |
| 45 | rst_i2c_n_pad[30] | O | OC | L | Reset for I$^2$C bus 30 |
| 46 | rst_i2c_n_pad[31] | O | OC | L | Reset for I$^2$C bus 31 |
| 47 | scl_pad[0] | IO | OC | H | SCL (clock) for I$^2$C bus 0 |
| 48 | sda_pad[0] | IO | OC | H | SDA (serial data) for I$^2$C bus 0 |
| 49 | i2c_int_n[0] | I | LVTTL | L | Interrupt from I$^2$C bus 0 |
| 50 | scl_pad[1] | IO | OC | H | SCL (clock) for I$^2$C bus 1 |
| 51 | sda_pad[1] | IO | OC | H | SDA (serial data) for I$^2$C bus 0 |
| 52 | i2c_int_n[1] | I | LVTTL | L | Interrupt from I$^2$C bus 1 |
| 53 | scl_pad[2] | IO | OC | H | SCL (clock) for I$^2$C bus 2 |
| 54 | sda_pad[2] | IO | OC | H | SDA (serial data) for I$^2$C bus 2 |
| 55 | i2c_int_n[2] | I | LVTTL | L | Interrupt from I$^2$C bus 2 |
| 56 | scl_pad[3] | IO | OC | H | SCL (clock) for I$^2$C bus 3 |
| 57 | sda_pad[3] | IO | OC | H | SDA (serial data) for I$^2$C bus 3 |
| 58 | i2c_int_n[3] | I | LVTTL | L | Interrupt from I$^2$C bus 3 |
| 59 | scl_pad[4] | IO | OC | H | SCL (clock) for I$^2$C bus 4 |
| 60 | sda_pad[4] | IO | OC | H | SDA (serial data) for I$^2$C bus 4 |
| 61 | i2c_int_n[4] | I | LVTTL | L | Interrupt from I$^2$C bus 4 |
| 62 | scl_pad[5] | IO | OC | H | SCL (clock) for I$^2$C bus 5 |
| 63 | sda_pad[5] | IO | OC | H | SDA (serial data) for I$^2$C bus 5 |
| 64 | i2c_int_n[5] | I | LVTTL | L | Interrupt from I$^2$C bus 5 |
| 65 | scl_pad[6] | IO | OC | H | SCL (clock) for I$^2$C bus 6 |
| 66 | sda_pad[6] | IO | OC | H | SDA (serial data) for I$^2$C bus 6 |
| 67 | i2c_int_n[6] | I | LVTTL | L | Interrupt from I$^2$C bus 6 |
| 68 | scl_pad[7] | IO | OC | H | SCL (clock) for I$^2$C bus 7 |
| 69 | sda_pad[7] | IO | OC | H | SDA (serial data) for I$^2$C bus 7 |
| 70 | i2c_int_n[7] | I | LVTTL | L | Interrupt from I$^2$C bus 7 |
| 71 | scl_pad[8] | IO | OC | H | SCL (clock) for I$^2$C bus 8 |
| 72 | sda_pad[8] | IO | OC | H | SDA (serial data) for I$^2$C bus 8 |
| 73 | i2c_int_n[8] | I | LVTTL | L | Interrupt from I$^2$C bus 8 |
| 74 | scl_pad[9] | IO | OC | H | SCL (clock) for I$^2$C bus 9 |
| 75 | sda_pad[9] | IO | OC | H | SDA (serial data) for I$^2$C bus 9 |
| 76 | i2c_int_n[9] | I | LVTTL | L | Interrupt from I$^2$C bus 9 |
| 77 | scl_pad[10] | IO | OC | H | SCL (clock) for I$^2$C bus 10 |
| 78 | sda_pad[10] | IO | OC | H | SDA (serial data) for I$^2$C bus 10 |
| 79 | i2c_int_n[10] | I | LVTTL | L | Interrupt from I$^2$C bus 10 |
| 80 | scl_pad[11] | IO | OC | H | SCL (clock) for I$^2$C bus 11 |
| 81 | sda_pad[11] | IO | OC | H | SDA (serial data) for I$^2$C bus 11 |
| 82 | i2c_int_n[11] | I | LVTTL | L | Interrupt from I$^2$C bus 11 |
| 83 | scl_pad[12] | IO | OC | H | SCL (clock) for I$^2$C bus 12 |
| 84 | sda_pad[12] | IO | OC | H | SDA (serial data) for I$^2$C bus 12 |
| 85 | i2c_int_n[12] | I | LVTTL | L | Interrupt from I$^2$C bus 12 |
| 86 | scl_pad[13] | IO | OC | H | SCL (clock) for I$^2$C bus 13 |
| 87 | sda_pad[13] | IO | OC | H | SDA (serial data) for I$^2$C bus 13 |
| 88 | i2c_int_n[13] | I | LVTTL | L | Interrupt from I$^2$C bus 13 |
| 89 | scl_pad[14] | IO | OC | H | SCL (clock) for I$^2$C bus 14 |
| 90 | sda_pad[14] | IO | OC | H | SDA (serial data) for I$^2$C bus 14 |
| 91 | i2c_int_n[14] | I | LVTTL | L | Interrupt from I$^2$C bus 14 |
| 92 | scl_pad[15] | IO | OC | H | SCL (clock) for I$^2$C bus 15 |
| 93 | sda_pad[15] | IO | OC | H | SDA (serial data) for I$^2$C bus 15 |
| 94 | i2c_int_n[15] | I | LVTTL | L | Interrupt from I$^2$C bus 15 |
| 95 | scl_pad[16] | IO | OC | H | SCL (clock) for I$^2$C bus 16 |
| 96 | sda_pad[16] | IO | OC | H | SDA (serial data) for I$^2$C bus 16 |
| 97 | i2c_int_n[16] | I | LVTTL | L | Interrupt from I$^2$C bus 16 |
| 98 | scl_pad[17] | IO | OC | H | SCL (clock) for I$^2$C bus 17 |
| 99 | sda_pad[17] | IO | OC | H | SDA (serial data) for I$^2$C bus 17 |
| 100 | i2c_int_n[17] | I | LVTTL | L | Interrupt from I$^2$C bus 17 |
| 101 | scl_pad[18] | IO | OC | H | SCL (clock) for I$^2$C bus 18 |
| 102 | sda_pad[18] | IO | OC | H | SDA (serial data) for I$^2$C bus 18 |
| 103 | i2c_int_n[18] | I | LVTTL | L | Interrupt from I$^2$C bus 18 |
| 104 | scl_pad[19] | IO | OC | H | SCL (clock) for I$^2$C bus 19 |
| 105 | sda_pad[19] | IO | OC | H | SDA (serial data) for I$^2$C bus 19 |
| 106 | i2c_int_n[19] | I | LVTTL | L | Interrupt from I$^2$C bus 19 |
| 107 | scl_pad[20] | IO | OC | H | SCL (clock) for I$^2$C bus 20 |
| 108 | sda_pad[20] | IO | OC | H | SDA (serial data) for I$^2$C bus 20 |

TABLE 4-continued

I/O Pin Descriptions

| Num | Name | Dir | Type | Act | Function |
|---|---|---|---|---|---|
| 109 | i2c_int_n[20] | I | LVTTL | L | Interrupt from I²C bus 20 |
| 110 | scl_pad[21] | IO | OC | H | SCL (clock) for I²C bus 21 |
| 111 | sda_pad[21] | IO | OC | H | SDA (serial data) for I²C bus 21 |
| 112 | i2c_int_n[21] | I | LVTTL | L | Interrupt from I²C bus 21 |
| 113 | scl_pad[22] | IO | OC | H | SCL (clock) for I²C bus 22 |
| 114 | sda_pad[22] | IO | OC | H | SDA (serial data) for I²C bus 22 |
| 115 | i2c_int_n[22] | I | LVTTL | L | Interrupt from I²C bus 22 |
| 116 | scl_pad[23] | IO | OC | H | SCL (clock) for I²C bus 23 |
| 117 | sda_pad[23] | IO | OC | H | SDA (serial data) for I²C bus 23 |
| 118 | i2c_int_n[23] | I | LVTTL | L | Interrupt from I²C bus 23 |
| 119 | scl_pad[24] | IO | OC | H | SCL (clock) for I²C bus 24 |
| 120 | sda_pad[24] | IO | OC | H | SDA (serial data) for I²C bus 24 |
| 121 | i2c_int_n[24] | I | LVTTL | L | Interrupt from I²C bus 24 |
| 122 | scl_pad[25] | IO | OC | H | SCL (clock) for I²C bus 25 |
| 123 | sda_pad[25] | IO | OC | H | SDA (serial data) for I²C bus 25 |
| 124 | i2c_int_n[25] | I | LVTTL | L | Interrupt from I²C bus 25 |
| 125 | scl_pad[26] | IO | OC | H | SCL (clock) for I²C bus 26 |
| 126 | sda_pad[26] | IO | OC | H | SDA (serial data) for I²C bus 26 |
| 127 | i2c_int_n[26] | I | LVTTL | L | Interrupt from I²C bus 26 |
| 128 | scl_pad[27] | IO | OC | H | SCL (clock) for I²C bus 27 |
| 129 | sda_pad[27] | IO | OC | H | SDA (serial data) for I²C bus 27 |
| 130 | i2c_int_n[27] | I | LVTTL | L | Interrupt from I²C bus 27 |
| 131 | scl_pad[28] | IO | OC | H | SCL (clock) for I²C bus 28 |
| 132 | sda_pad[28] | IO | OC | H | SDA (serial data) for I²C bus 28 |
| 133 | i2c_int_n[28] | I | LVTTL | L | Interrupt from I²C bus 28 |
| 134 | scl_pad[29] | IO | OC | H | SCL (clock) for I²C bus 29 |
| 135 | sda_pad[29] | IO | OC | H | SDA (serial data) for I²C bus 29 |
| 136 | i2c_int_n[29] | I | LVTTL | L | Interrupt from I²C bus 29 |
| 137 | scl_pad[30] | IO | OC | H | SCL (clock) for I²C bus 30 |
| 138 | sda_pad[30] | IO | OC | H | SDA (serial data) for I²C bus 30 |
| 139 | i2c_int_n[30] | I | LVTTL | L | Interrupt from I²C bus 30 |
| 140 | scl_pad[31] | IO | OC | H | SCL (clock) for I²C bus 31 |
| 141 | sda_pad[31] | IO | OC | H | SDA (serial data) for I²C bus 31 |
| 142 | i2c_int_n[31] | I | LBTTL | L | Interrupt from I²C bus 31 |
| 143 | cnct | O | LVTTL | H | USB connect control |

The term "Dir" refers to Pin direction from the intellectual property perspective. I refers to Input. 0 refers to Output. I/O refers to bi-directional. Regarding "Type," LVTTL–Vccio=3.3V nominal (Sources current from Vccio on high, sinks current to ground on low.) "OC" represents open collector (drain) (Sinks current to ground on low; high impedance un-driven on high.). "H" is active high, and "L" is active low.

Regarding pin descriptions, there are global control pins (2 pins). "gts_n" represents global 3 state control, is active low, and when active forces all output and bi-directional pins to high impedance un-driven state. "rst_gsr_n" represents global set/reset, is active low, and forces all blocks and I/O to power up conditions.

Regarding ULPI interface pins (12 pins), "clk" represents a 60 MHz clock provided by PHY, and may be the master timing source. "dir" represents direction and determines ownership of data bus. When "dir" is high, the PHY drives the data bus. When "dir" is low, the data bus is driven in accordance with the present subject matter.

"nxt" is a pin driven by the PHY to throttle data and to ensure common ambiguity during data bus turn around cycles. It may be sampled on the falling edge of clk. When "nxt" is driven low, the device driving the data bus holds the bus in its previous state. When "nxt" is driven high, the data bus driving device may transition to the next data state on the rising edge of clk. "nxt" is driven low for one clock cycle during bus turn around cycles to ensure that both the PHY and the IP data bus drivers are in a high impedance, un-driven state. This can guarantee common ambiguity during turn around cycles.

ULPI interface pins (12 pins) may include a "clk" (clock). Further, these pins may include a "dir" (direction) pin that determines when "dir" is high. The "stp_pad" pin may be driven to abort data driven by the PHY and obtain control of the data bus, or to signal end of data. The "data_pad" pins may be an 8 pin bi-directional data bus between the PHY and the IP. In the "data_pad" pins, data[0] is the least significant bit, and data[7] is the most significant bit.

The "I²C" resets (32 pins) are represented by "rst_i2c_n_pad" and may be active low, and have open drain outputs individually controlled by the I²C register set associated with that particular I²C bus. They may be used to globally reset all peripheral devices connected to that I²C bus.

The I²C busses (96 pins) may include "scl_pad," "sda_pad," and "i2c_int_n" pins. The "scl_pad" pins may include 32 open drain input/outputs individually controlled by the I²C state machine associated with a particular I²C bus. The "scl_pad" pins may be used to control the timing of to that I²C bus. "scl_pad" is normally driven low by the I²C state machine, but may be held in a low state by a peripheral device to throttle data, a condition referred to as clock stretching.

The "sda_pad" pins may include 32 open drain, bi-directional pins, each associated with a particular I²C bus. "sda_pad" may be used to control the I²C state and to implement a serial data link.

The "i2c_int_n" pins may include 32 active low inputs, each associated with a particular I²C bus, used by peripheral devices to request service. "i2c_int_n" is normally implemented as an open drain bus to multiple devices.

The USB connect control (1 pin) may be represented by "i2c_int_n" and include one active high pin to control the quick switch.

Regarding power on conditions, "stp_pad" may be driven high. "data_pad," "rst_i2c_n_pad," "scl_pad," and "sda_pad" may have high impedance. "cnct" may be driven low.

Figure 17:
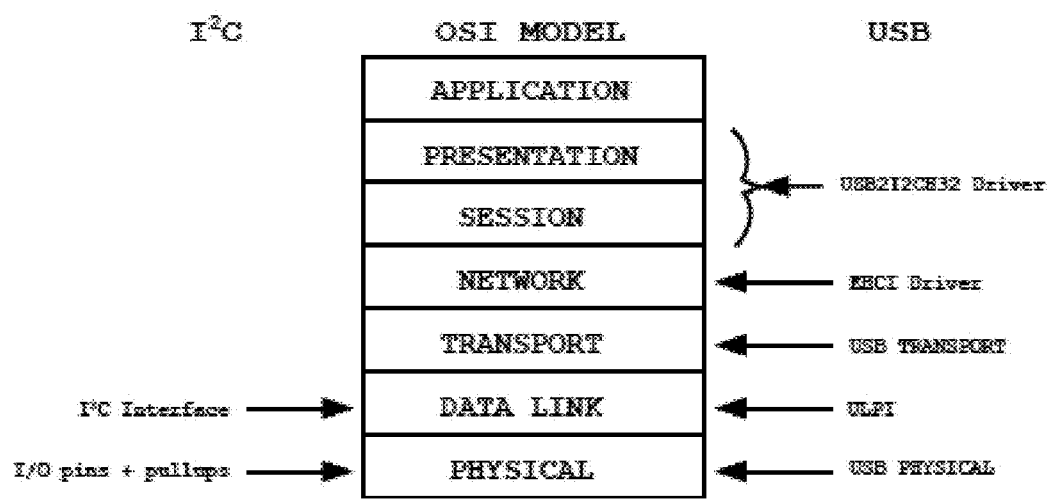
FIG. 17 is a diagram of the interface relationships to the OSI model in accordance with embodiments of the present invention.

Regarding interface requirements, the FPGA hardware and software interfaces may combine to form the first six layers of the seven layer the Open Systems Interconnect (OSI) model. FIG. 17 illustrates a diagram of the interface relationships to the OSI model in accordance with embodiments of the present invention. Since the layers above the data link layer on the I²C side are handled by the USB, there may be no need to replicate those layers.

Figure 18:
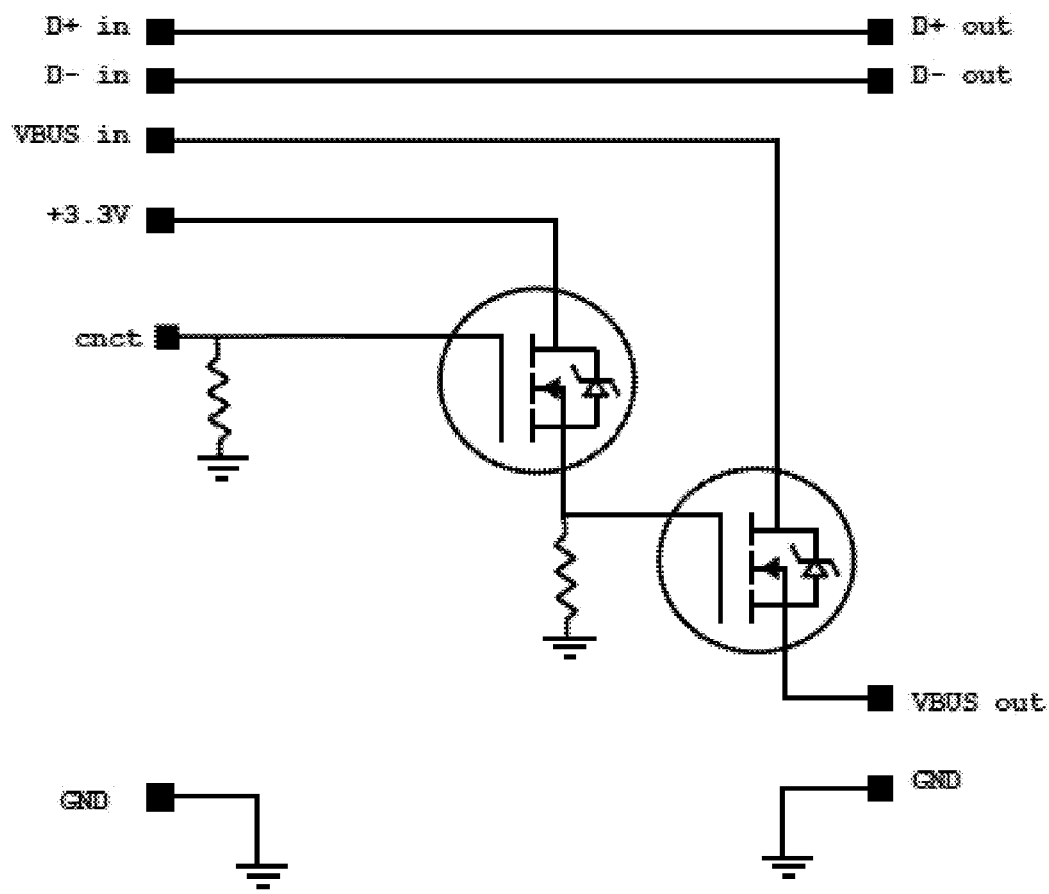
FIG. 18 is a diagram of an example quick switch in accordance with embodiments of the present invention.

The USB physical layer may handled by the PHY as may be understood by those of skill in the art. In order to manage connection to the USB physical layer, a "quick switch," an electrically controlled analog switch, may be added between the PHY and the USB physical connection, allowing the intellectual property to control connection to the USB. This quick switch may only operate on VBUS, so does not affect the longitudinal balance, terminating impedance, or signal quality of D+ and D−. FIG. 18 illustrates a diagram of an example quick switch in accordance with embodiments of the present invention.

Figure 19:
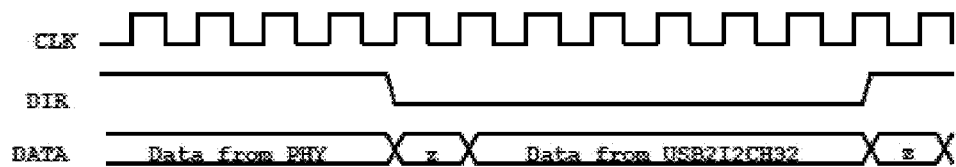
FIG. 19 is a diagram showing example DIR operation in accordance with embodiments of the present invention.

The ULPI interface may include 11 LVTTL signals: a 60 MHz clock signal driven by the PHY; 2 control signals, DIR and NXT, driven by the PHY; 1 control signal, STP, driven by the USB2I2CH32; and an eight-bit bidirectional data bus. DIR may control ownership of the bidirectional data bus. When DIR is high, data is driven by the PHY to the USB2I2CH32. When DIR is low, the USB2I2CH32 can drive data to the PHY. DIR will only transition on a rising edge of CLK. In order to guarantee minimum common ambiguity, neither the PHY or the USB2I2CH32 can drive the data bus during the first clock cycle after a DIR transition. This is known as a turn around cycle. FIG. 19 illustrates a diagram showing example DIR operation in accordance with embodiments of the present invention.

When DIR is low NXT is used by the PHY to throttle data transfers. When DIR and NXT are at a low level at the rising edge of a clock, the previous data is held constant on the data bus. When DIR is low and NXT is high at the rising edge of the clock, data will transition to the next data byte.

Figure 20:
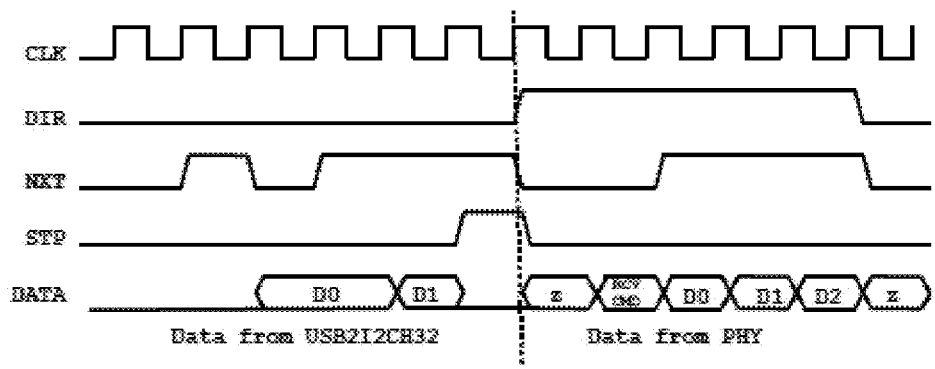
FIG. 20 is a diagram showing behavior of NXT and STP when DIR is low in accordance with embodiments of the present invention.

STP is used during data transfers when DIR is low by the USB2I2CH32 to indicate the end of data. When all data has been sent, the USB2I2CH32 drives STP high for one clock cycle. FIG. 20 illustrates a diagram showing behavior of NXT and STP when DIR is low.

Figure 21:
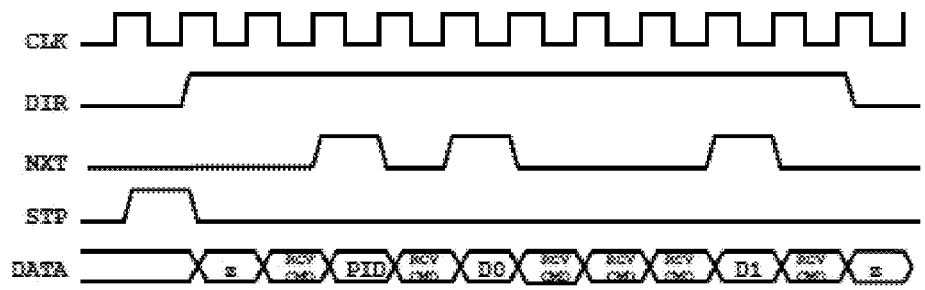
FIG. 21 is a diagram showing behavior of NXT when DIR is high in accordance with embodiments of the present invention.

When DIR is high, NXT is used to differentiate between USB traffic and RECEIVE commands. When NXT is low, it indicates a RECEIVE command. When NXT is high it indicates USB traffic. RECEIVE commands may be issued at any time DIR is high. The PHY may issue as many consecutive RECEIVE commands as it requires. This is done during USB transfers when the PHY is waiting for more data. FIG. 21 illustrates a diagram showing behavior of NXT when DIR is high.

During periods when the PHY has no USB traffic to send and no line transitions to report with RECEIVE commands, it can hold DIR low. If the USB2I2CH32 has no traffic to send back during this period it can hold data and STP low. If the PHY then wants to begin USB traffic, it can assert NXT high in the same cycle as it drives DIR high to signal the beginning of USB traffic.

Figure 22:
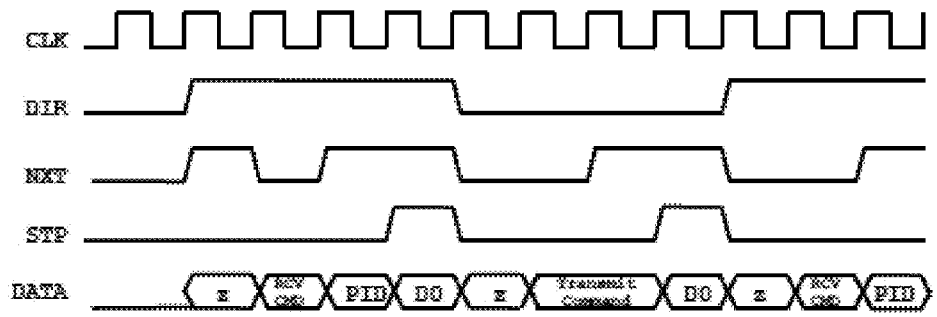
FIG. 22 is a diagram of USB transfer interrupted by STP assertion in accordance with embodiments of the present invention.

STP can also be used to abort a data transfer from the PHY to the USB2I2CH32. If STP is asserted for one clock cycle while DIR is high, the PHY can immediately stop the data transfer and drive DIR low. The PHY cannot drive DIR back high until the USB2I2CH32 drives STP high for one clock cycle again. The USB2I2CH32 only uses this function during reset, in order to send register write commands to disconnect the PHY from the USB bus (soft disconnect). FIG. 22 illustrates a diagram of USB transfer interrupted by STP assertion in accordance with embodiments of the present invention.

The PHY may send receive commands to the USB2I2CH32 in order to report VBUS, line state, and status information and to flag the beginning and end of USB traffic to the USB2I2CH32. The receive command consist of a single byte, sent when DIR is high and NXT is low, except when this condition occurs during a turn-around cycle.

The byte may be encoded as shown in Table 5 below.

TABLE 5

Receive Command Byte

| Data | Name | Description and Value |
|---|---|---|
| 1:0 | LineState | UTMI + LineState signals:<br>data(0) = LineState(0)<br>data(1) = LineState(1) |
| 3:2 | Vbus State | Encoded VBUS state |
| 5:4 | RxEvent | Encoded UTMI event signals |
| 6 | ID | Set to the value of Idgnd (UTMI + IdDig. Valid 50 ms after IdPullup is set to 1b. |
| 7 | alt_int | Asserted when a non-USB interrupt occurs. This bit must be set when an unmasked event occurs on any bit in the Carkit Interrupt Latch register. The link must read the Carkit Interrupt Latch register to determine the source of the interrupt. |

Transmit commands can be used by the USB2I2CH32 to send idle code, read and write registers in the PHY, control chirp, initiate USB transfers, and to report errors. Transmit commands consist of a 2-bit command code and a 6-bit payload as shown in Table 6 below.

TABLE 6

Transmit Command Byte Format

| Byte Name | Command Code (bits 7:0) | Payload (bits 5:0) | Description |
|---|---|---|---|
| Special | 00 | 000000 (NOOP) | No operation. 00 (hex) is the idle value of the data bus. The USB2I2CH32 drives NOOP by default. |
| | | XXXXXX (RSVD) | |
| Transmit | 01 | 000000 (NOPID) | Reserved command space. Values other t |
| | | 00XXXX (PID) | Transmit USB packet. Bits 3-0 indicates USB packet identifier PID(3:0). |
| | | XXXXXX (RSVD) | Reserved command space. Values other than those above will give undefined behavior. |
| RegWrite | 10 | 101111 (EXTW) | Extended register write command. Eight bit address available in next cycle. |
| | | XXXXXX (REGW) | Register write command with 6-bit immediate address. |

TABLE 6-continued

Transmit Command Byte Format

| Byte Name | Command Code (bits 7:0) | Payload (bits 5:0) | Description |
|---|---|---|---|
| RegRead | 11 | 101111 (EXTR) | Extended register read command. Eight bit address available in next cycle. |
| | | XXXXXX (REGR) | Register read command with 6-bit immediate address. |

When performing a RegWrite command, some registers can support a set and clear operation at separate addresses. A set operation performs a logical or of the write date and the register contents. A clear operation performs a logical and of the write data and the register contents. The addresses used in the RegRead and the RegWQrite commands are as shown in Table 7 below.

TABLE 7

ULPI PHY Register Map

| Name | Size (bits) | Rd | Wr | Set | Clr |
|---|---|---|---|---|---|
| Immediate Register Set | | | | | |
| Vendor ID low | 8 | 00h | — | — | — |
| Vendor ID high | 8 | 01h | — | — | — |
| Product ID low | 8 | 02h | — | — | — |
| Product ID high | 8 | 03h | — | — | — |
| Function Control | 8 | 04-06h | 04h | 05h | 06h |
| Interface Control | 8 | 07h-09h | 07h | 08h | 09h |
| OTG Control | 8 | 0A-0Ch | 0Ah | 0Bh | 0Ch |
| USB Interrupt Enable Rising | 8 | 0D-0Fh | 0Dh | 0Eh | 0Fh |
| USB Interrupt Enable Falling | 8 | 10-12h | 10h | 11h | 12h |
| USB Interrupt Status | 8 | 13h | — | — | — |
| USB Interrupt Latch | 8 | 14h | — | — | — |
| Debug | 8 | 15h | — | — | — |
| Scratch Register | 8 | 16-18h | 16h | 17h | 18h |
| Carkit Control (Optional) | 8 | 19-1Bh | 19h | 1Ah | 1Bh |
| Carkit Interrupt Delay (Optional) | 8 | 1Ch | 1Ch | — | — |
| Carkit Interrupt Enable (Optional) | 8 | 1D-1Fh | 1Dh | 1Eh | 1Fh |
| Carkit Interrupt Status (Optional) | 8 | 20h | — | — | — |
| Carkit Interrupt Latch (Optional) | 8 | 21h | — | — | — |
| Carkit Pulse Control (Optional) | 8 | 22-24h | 22h | 23h | 24h |
| Transmit Positive Width | 8 | 25h | 25h | — | — |
| Transmit Negative Width | 8 | 26h | 26h | — | — |
| Reserved | 8 | | 28-2Eh | | |
| Access Extended Register Set | 8 | — | 2Fh | — | |
| Vendor Specific | 8 | | 30-3Fh | | |

The USB2I2CH32 does not use extended register reads or writes.

Figure 23:
FIG. 23 is a diagram of an example PID in accordance with embodiments of the present invention.

All USB packets may begin with a packet identifier (PID) field which indicates the type or direction of the data transfer and the format of the rest of the packet. The PID consists of a four bit identifier and a four bit check field. The check field is the ones complement of the identifier. FIG. 23 illustrates a diagram of an example PID in accordance with embodiments of the present invention. Table 8 below shows an example of PID types.

TABLE 8

PID Types

| PID Type | PID Name | PID[3:0] | Description |
|---|---|---|---|
| TOKEN | OUT | 0001B | Address + endpoint in host to device transaction |
| | IN | 1001B | Address + endpoint in a device to host transaction |
| | SOF | 0101B | Start of frame marker and frame number |
| | SETUP | 1101B | Address + endpoint in host to device transaction for setup of the control endpoint |
| DATA | DATA0 | 0011B | Data packet PID even |
| | DATA1 | 1011B | Data packet PID odd |
| | DATA2 | 0111B | Data packet high speed, high bandwidth isochronous transaction in a microframe |
| | MDATA | 1111B | Data packet high speed for split and high bandwidth isochronous transactions |
| Handshake | ACK | 0010B | Receiver accepts error free data packet |
| | NAK | 1010B | Receiver cannot accept or transmitter cannot send data |
| | STALL | 1110B | Endpoint halted or control request unsupported |
| | NYET | 0110B | No response yet from receiver |
| Special | PRE/ERR | 1100B | (token) host issued preamble to low speed devices (handshake) split transaction error |
| | SPLIT | 1000B | High speed split transaction (hubs only) |
| | PING | 0100B | High speed flow control for bulk or control endpoints |
| | Reserved | 000B | Reserved PID |

Figure 24:
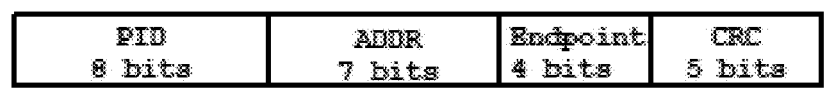
FIG. 24 is a diagram of an example token packet in accordance with embodiments of the present invention.

Token packets, except for SOF, may have a seven bit address and a four bit endpoint number field immediately following the PID. The SOF token uses these eleven bits to specify the frame number. Following these eleven bits is a five bit cyclic redundancy check (CRC) field. The CRC is the ones complement of the remainder after division of 11 bit address/endpoint (or frame number) field, least significant bit first, by the generating polynomial $x5+x2+1$. When the packet is checked, the 11 bits of the address/endpoint field may first run through the checker least significant bit (LSb) to most significant bit (MSb) and the CRC is sent through MSb to LSb. The remainder can be $x3+x2$ in the absence of errors. FIG. 24 illustrates a diagram of an example token packet in accordance with embodiments of the present invention.

Figure 25:
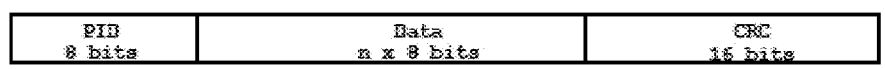
FIG. 25 is a diagram of an example data packet in accordance with embodiments of the present invention.

Data packets may consist of a PID, an integral number of data bytes that is less than or equal to the maximum allowed transfer size for the peripheral speed18, and a sixteen bit CRC that is the one's complement of the remainder after division of the data bytes by the generating polynomial $x16+x15+x2+1$. Upon reception the data and the CRC are again divided by the generating polynomial. In the absence of error the remainder will be $x15+x3+x2+1$ (800 BH). FIG. 25 illustrates a diagram of an example data packet in accordance with embodiments of the present invention.

In addition to the CRC, bulk transfers are also protected by a data toggling mechanism whereby consecutive reads or writes to a particular endpoint in the same frame (without an intervening configuration command) will alternate between DATA0 and DATA1 PID's. The first data packet after an SOF or a SETUP token will be initialized to DATA0. The data PID will not toggle when a NAK or a corrupted ACK token is received.

Figure 26:
FIG. 26 is a diagram of an example handshake packet in accordance with embodiments of the present invention.
Figure 27A:
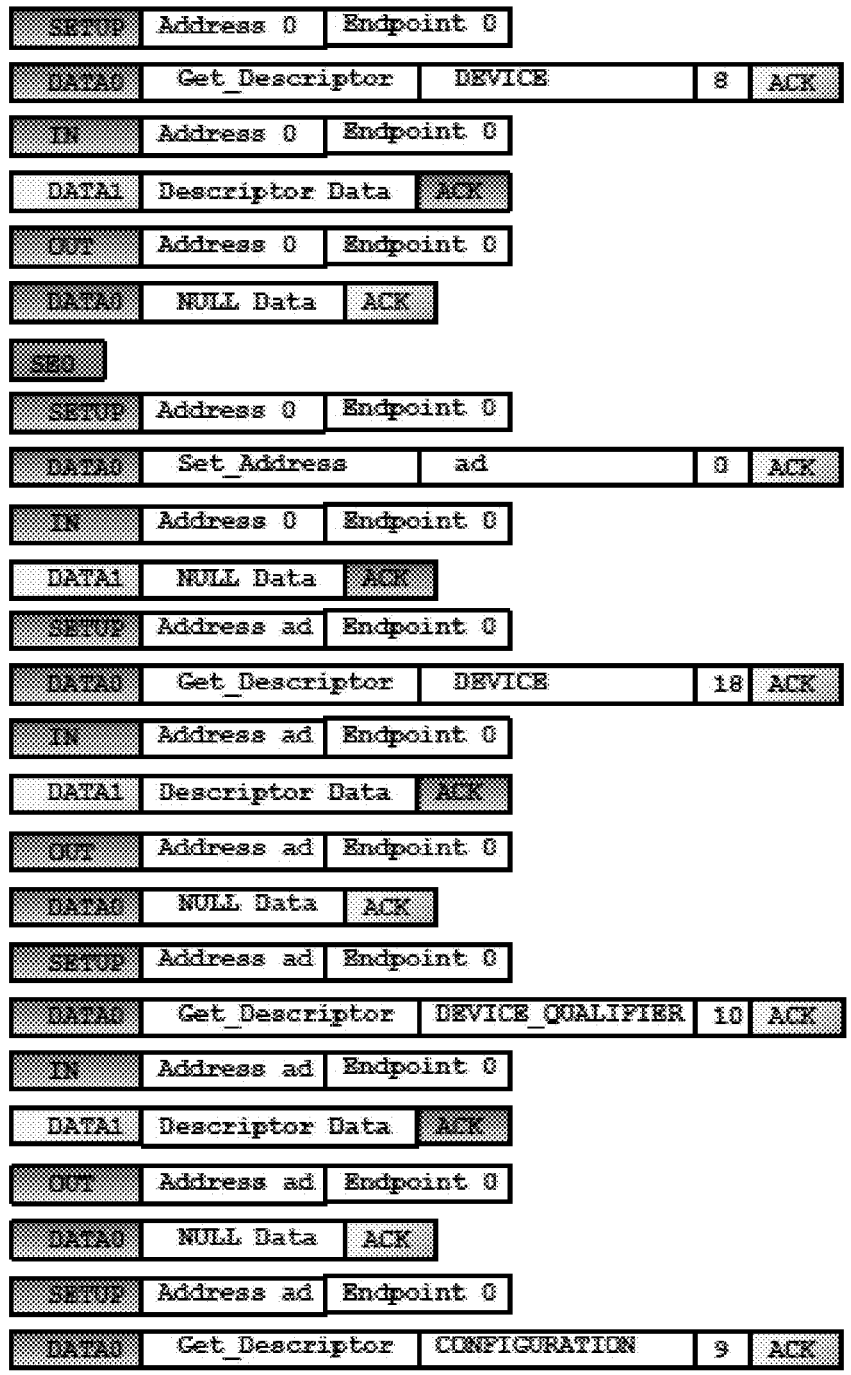
FIGS. 27A-27F illustrate example protocol flows for USB212CH32 enumeration in accordance with embodiments of the present invention.
Figure 27B:
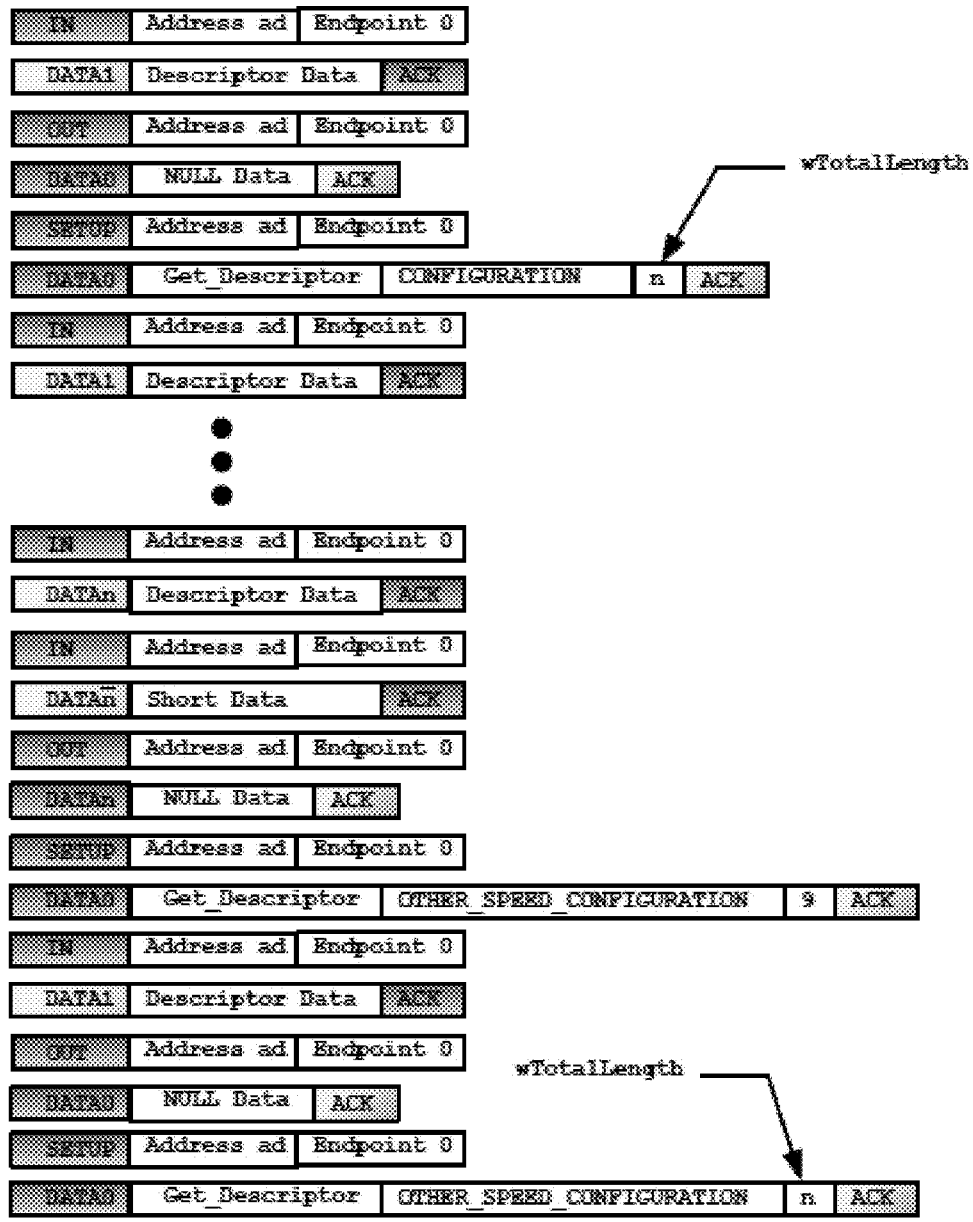
Figure 27C:
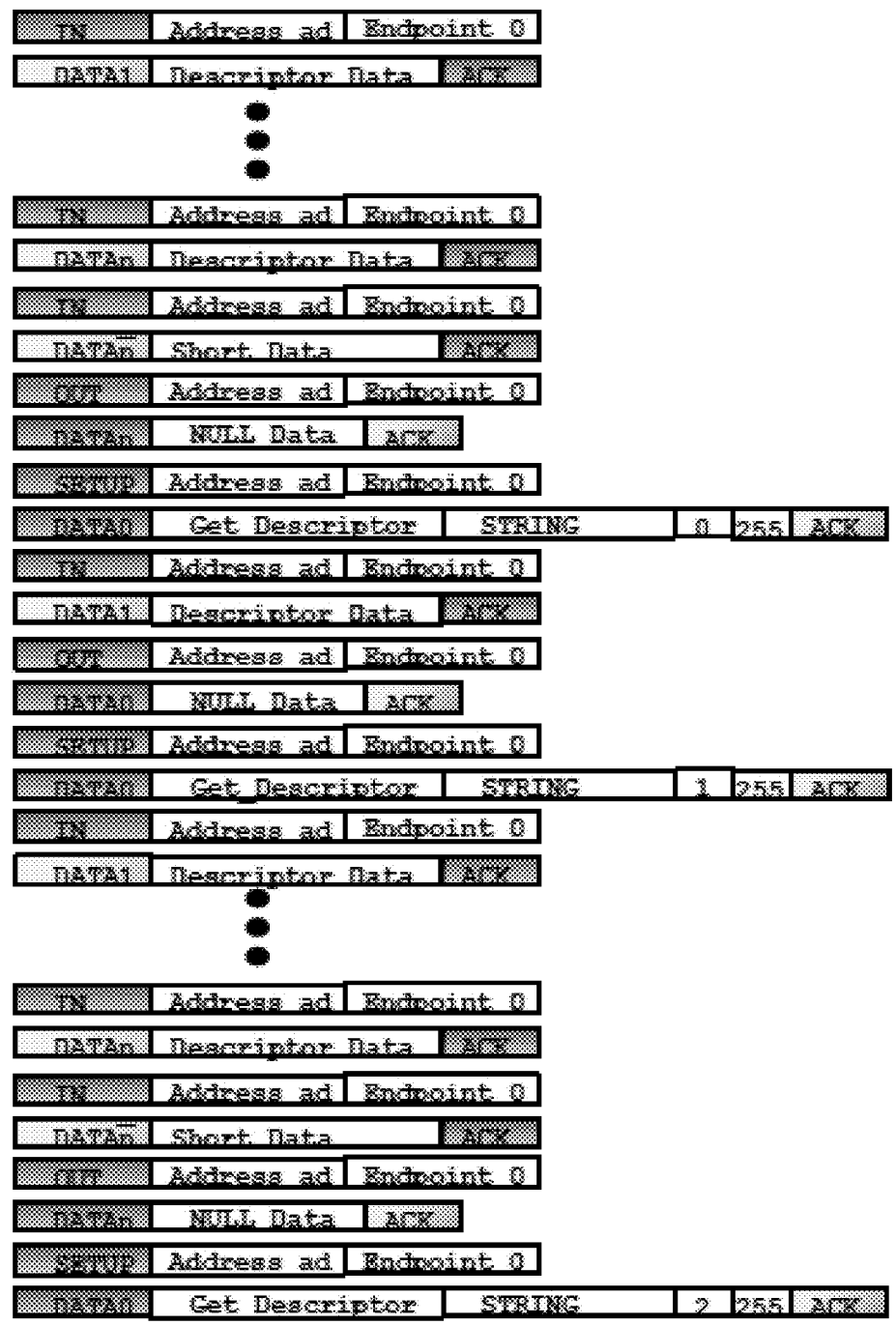
Figure 27D:
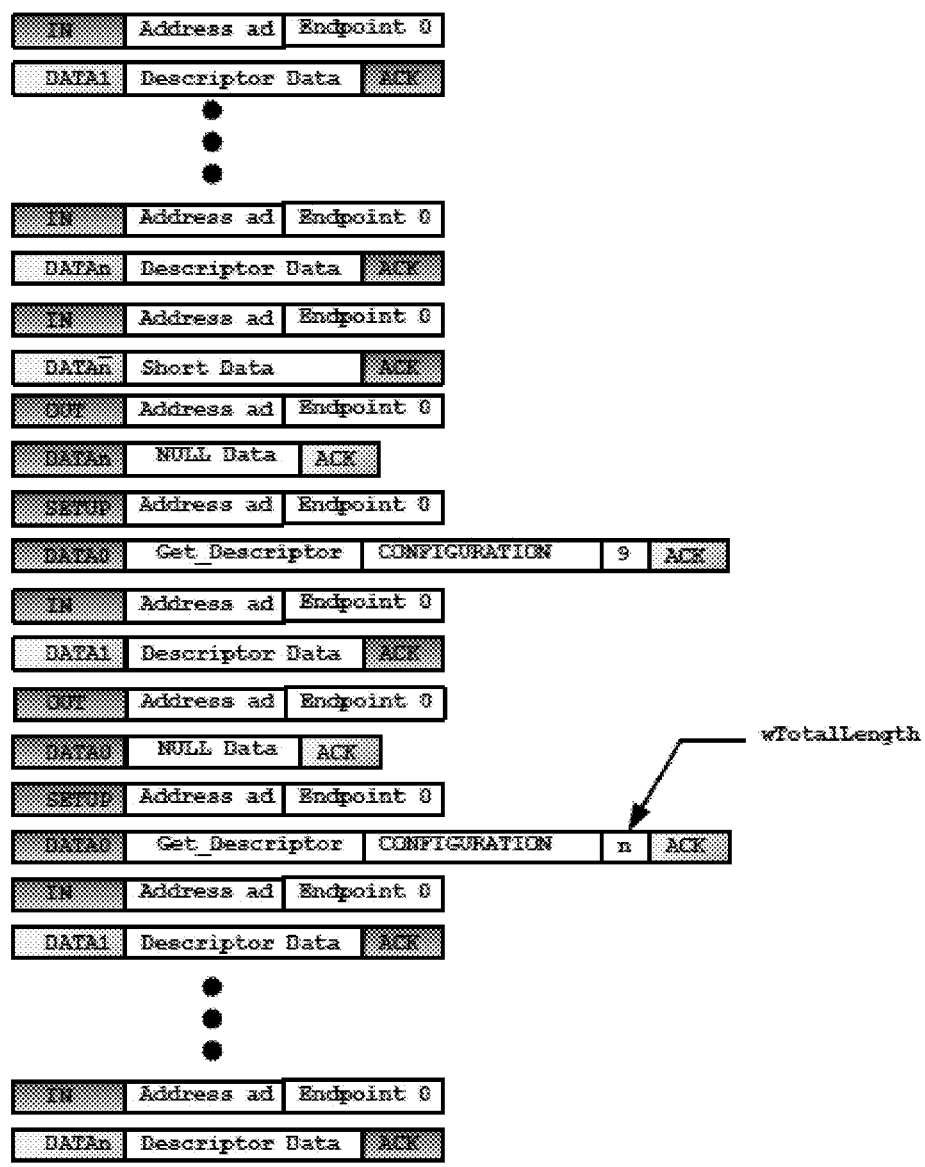
Figure 27E:
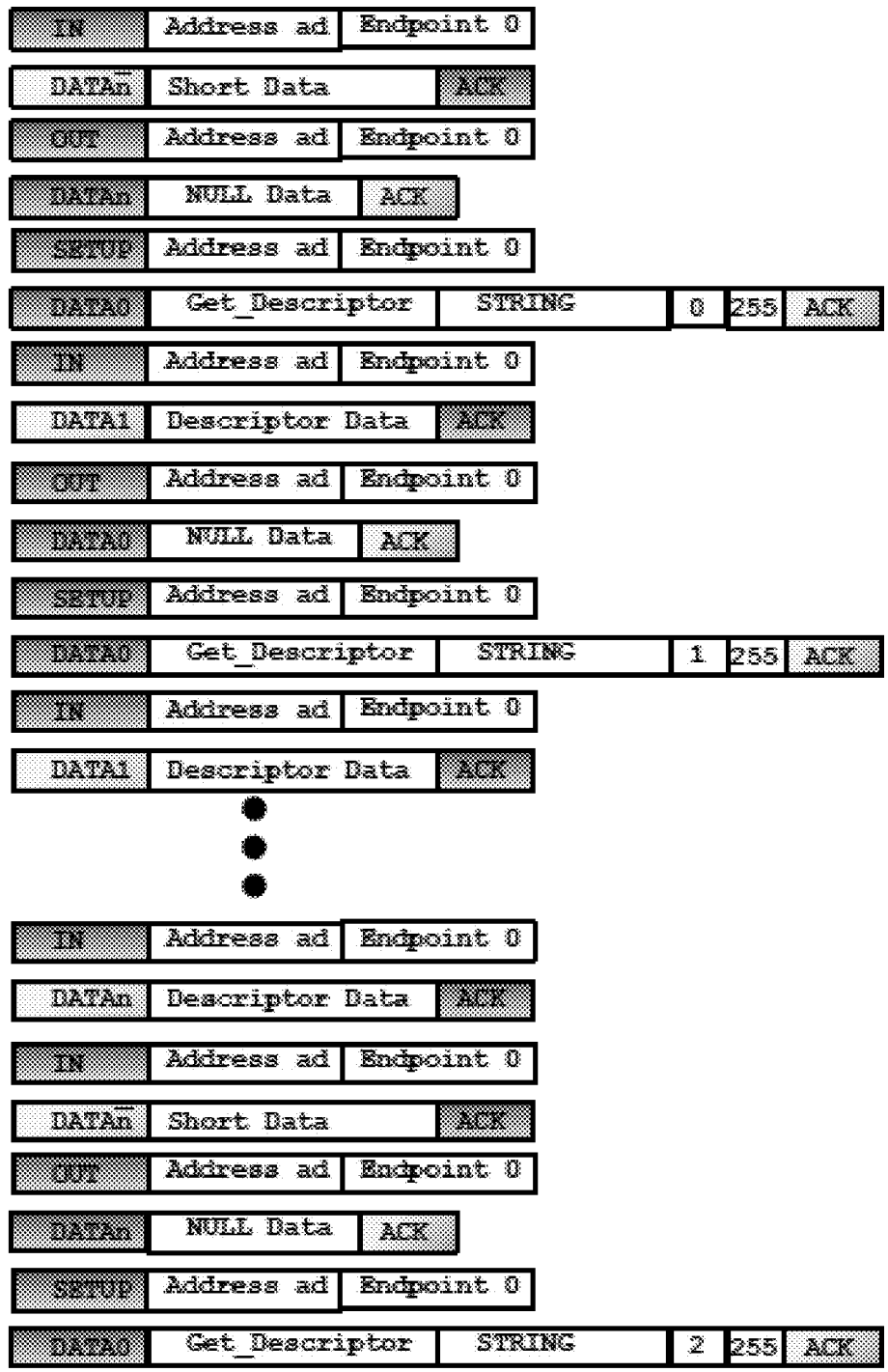
Figure 27F:
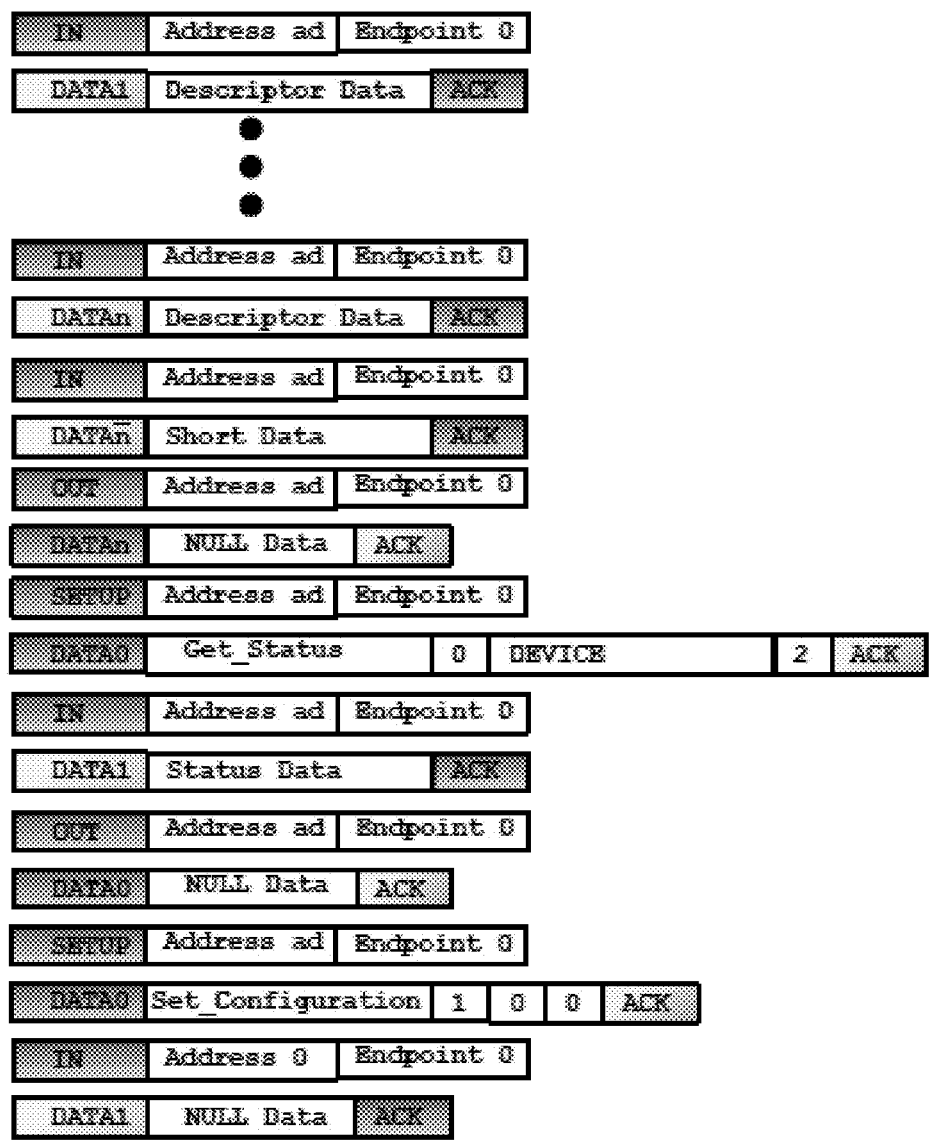

Handshake packets may consist of only a PID. Handshake packets are used to report the status of a data transaction and can return values indicating successful reception of data, command acceptance or rejection, flow control, and halt conditions. Only transaction types that support flow control can return handshakes. Handshakes are always returned in the handshake phase of a transaction and may be returned, instead of data, in the data phase. FIG. 26 illustrates a diagram of an example handshake packet in accordance with embodiments of the present invention. The USB2I2CH32 will only return ACK, NAK, and STALL handshake packets.

The only special packet that the USB2I2CH32 supports is the PING packet. PING protocol is required by the USB specification for endpoints 0, 1, 2, 3, and 4 when operating is high speed mode.

Control transfers minimally have two transaction stages: Setup and Status. A control transfer may optionally contain a Data stage between the Setup and Status stages. During the Setup stage, a SETUP transaction is used to transmit information to the control endpoint of a function. SETUP transactions are similar in format to an OUT but use a SETUP rather than an OUT PID. A SETUP always uses a DATA0 PID for the data field of the SETUP transaction. The function receiving a SETUP must accept the SETUP data and respond with ACK; if the data is corrupted, discard the data and return no handshake. In additional, the device receiving a SETUP packet must set its data toggle synchronization to one.

The Data stage, if present, of a control transfer consists of one or more IN or OUT transactions and follows the same protocol rules as bulk transfers. All the transactions in the Data stage must be in the same direction (i.e., all IN or all OUT). The amount of data to be sent during the data stage and its direction are specified during the Setup stage. If the amount of data exceeds the pre-negotiated data packet size, the data is sent in multiple transactions (IN or OUT) that carry the maximum packet size. Any remaining data is sent as a residual in the last transaction.

The status stage of a control transfer is the last transaction in the sequence. The status stage transactions follow the same protocol sequence as bulk transactions. Status stage for devices operating at high-speed also includes the PING protocol. A status stage is delineated by a change in direction of data flow from the previous stage and always uses a DATA1 PID. If, for example, the Data stage consists of OUT's, the status is a single IN transaction. If the control sequence has no Data stage, then it consists of a Setup stage followed by a Status stage consisting of an IN transaction. The DATA1 packet during the status stage is always a zero length packet.

The SETUP packet is a specially formatted, eight byte DATA0 packet that the host sends immediately following the SETUP token. It is used to convey the request type and the direction of control transfer. It is formatted as shown in Table 9 below.

TABLE 9

Format of SETUP Packet

| Offset | Field | Size | Value | Description |
|---|---|---|---|---|
| 0 | bmRequestType | 1 | Bitmap | Characteristics of request: Bit 7: Data transfer direction 0 = Host-to-device 1 = Device-to-host D6 . . . 5: Type 0 = Standard 1 = Class 2 = Vendor 3 = Reserved D4 . . . 0: Recipient 0 = Device 1 = Interface 2 = Endpoint 3 = Other 4 . . . 31 = Reserved |
| 1 | bRequest | 1 | Value | Specific request |
| 2 | wValue | 2 | Value | Word-sized field that varies according to request |
| 4 | wIndex | 2 | Index of Offset | Word-sized field that varies according to request; typically used to pass an index or offset |
| 6 | wLength | 2 | Count | Number of bytes to transfer if there is a Data stage |

The bmRequestType field identifies the characteristics of the specific request. In particular, this field identifies the direction of data transfer in the second phase of the control transfer. The state of the Direction bit is ignored if the wLength field is zero, signifying there is no Data stage. If the device receiving the SETUP packet does not support the requested transaction, or the endpoint to which the SETUP packet was directed is halted, the device can return a STALL packet on the first transaction of the data or status stage.

The USB specification defines a series of standard requests that all devices must support. In addition, a device class may define additional requests. A device vendor may also define requests supported by the device.

Requests may be directed to the device, an interface on the device, or a specific endpoint on a device. This field also specifies the intended recipient of the request. When an interface or endpoint is specified, the wIndex field identifies the interface or endpoint.

The bmRequest field specifies the particular request. The Type bits in the bmRequestType field modify the meaning of this field.

The contents of the wValue field vary according to the request. It is used to pass a parameter to the device, specific to the request.

The wIndex field can used in requests to specify an endpoint or an interface.

The wLength field defines the length of the data transferred during the second phase of the control transfer. The direction of data transfer (host-to-device/device-to-host) is indicated by the Direction bit of the bmRequestType field. If this field is zero, there is no data transfer phase. On an input request, a device must never return more data than is indicated by the wLength value; it may return less. On an output request, wLength will always indicate the exact amount of data to be sent by the host. Device behavior is undefined if the host should send more data than is specified in wLength.

In USB device framework, the device reports its identity and its capabilities to the host by means of a set of descriptors. Descriptors fall into one of three categories; standard, class specific, and vendor specific. The USB2I2CH32 device does not use any class specific descriptors.

Standard descriptors are used by all USB devices to report the basic identity and capabilities of the device. The first of these descriptors is the DEVICE type. It is formatted as shown in Table 10 below.

TABLE 10

DEVICE Descriptor

| Offset | Field | Size | Value | Description |
|---|---|---|---|---|
| 0 | bLength | 1 | Number | Size of this descriptor in bytes |
| 1 | bDescriptoType | 1 | Constant | DEVICE Descriptor Type |
| 2 | bcdUSB | 2 | BCD | USB Specification Release Number in Binary-Coded Decimal (i.e., 2.10 is 210H). This field identifies the release of the USB Specification with which the device and its descriptors are compliant. |
| 4 | bDeviceClass | 1 | Class | Class code (assigned by the USB-IF). If this field is reset to zero, each interface within a configuration specifies its own class information and the various interfaces operate independently. If this field is set to a value between 1 and FEH, the device supports different class specifications on different interfaces and the interfaces may not operate independently. This value identifies the class definition used for the aggregate interfaces. If this field is set to FFH, the device class is vendor-specific. |
| 5 | bDeviceSubClass | 1 | Subclass | Subclass code (assigned by the USB-IF). These codes are qualified by the value of the bDeviceClass field. If the bDeviceClass field is set to zero, this field must also be reset to zero. If the bDeviceClass filed is not set to FFH, all values are reserved for assignment by the USB-IF. |
| 6 | bDeviceProtocol | 1 | Protocol | Protocol code (assigned by the USB-IF). These codes are qualified by the value of the bDeviceClass and the bDeviceSubClass fields. If a device supports class-specific protocols on a device basis, this code identifies the protocols that the device uses as defined by the specification of the device class. If this field is reset to zero, the device does not use class-specific protocols on a device basis. However, it may use class specific protocols on an interface basis. If this field is set to FFH, the device uses a vendor-specific protocol on a device basis. |
| 7 | bMaxPacketSize0 | 1 | Number | Maximum packet size for endpoint zero (only 8, 16, 32, or 64 are valid) |
| 8 | idVendor | 2 | ID | Vendor ID (assigned by the USB-IF) |
| 10 | idProduct | 2 | ID | Product ID (assigned by the manufacturer) |
| 12 | bcdDevice | 2 | BCD | Device release number in binary-coded decimal |
| 14 | iManufacturer | 1 | Index | Index of string descriptor describing manufacturer |
| 15 | iProduct | 1 | Index | Index of string descriptor describing product |
| 16 | iSerialNumber | 1 | Index | Index of string descriptor describing the device's serial number |
| 17 | bNumConfigurations | 1 | Number | Number of possible configurations |

If this is a high speed capable device, a DEVICE_QUALIFIER descriptor will follow the DEVICE descriptor. The DEVICE_QUALIFIER defines how this device would operate if it were operating at the other speed. For example, if the device is currently operating at full-speed, the device qualifier returns information about how it would operate at high-speed and vice-versa. The DEVICE_QUALIFIER descriptor is formatted as shown in Table 11 below.

TABLE 11

DEVICE_QUALIFIER Descriptor

| Offset | Field | Size | Value | Description |
|---|---|---|---|---|
| 0 | bLength | 1 | Number | Size of this descriptor in bytes |
| 1 | bDescriptoType | 1 | Constant | DEVICE_QUALIFIE Descriptor Type |
| 2 | bcdUSB | 2 | BCD | USB specification version number (e.g., 0200H for V2.00) |
| 4 | bDeviceClass | 1 | Class | Class Code |
| 5 | bDeviceSubClass | 1 | SubClass | SubClass Code |
| 6 | bDeviceProtocol | 1 | Protocol | Protocol Code |
| 7 | bMaxPacketSize0 | 1 | Number | Maximum packet size for other speed |
| 8 | bNumConfigurations | 1 | Number | Number of Other-speed configurations |
| 9 | bReserved | 1 | Zero | Reserved for future use, must be zero |

The next standard descriptor is the CONFIGURATION descriptor. When the CONFIGURATION descriptor is requested, the device will return the CONFIGURATION descriptor and all INTERFACE_ASSOCIATION, INTERFACE, ENDPOINT, and class specific descriptors. It may optionally return vendor specific descriptors as well. The configuration descriptor is formatted as shown in Table 12 below.

TABLE 12

CONFIGURATION Descriptor

| Offset | Field | Size | Value | Description |
|---|---|---|---|---|
| 0 | bLength | 1 | Number | Size of this descriptor in bytes |
| 1 | bDescriptoType | 1 | Constant | CONFIGURATION Descriptor Type |
| 2 | wTotalLength | 2 | Number | Total length of data returned for this configuration. Includes the combined length of all descriptors (configuration, interface, endpoint, and class- or vendor-specific) returned for this configuration. |
| 4 | bNumInterfaces | 1 | Number | Number of interfaces supported by this configuration. |
| 5 | bConfigurationValue | 1 | Number | Value to use as an argument to the SetConfiguration( ) request to select this configuration. |
| 6 | iConfiguration | 1 | Index | Index of string descriptor describing this configuration |
| 7 | bmAttributes | 1 | Bitmap | Configuration characteristics<br>D7: Reserved (set to one)<br>D6: Self-powered<br>D5: Remote Wakeup<br>D4 . . . 0: Reserved (reset to zero)<br>D7 is reserved and must be set to one for historical reasons.<br>A device configuration that uses power from the bus and a local source reports a non-zero value in bMaxPower to indicate the amount of bus power required and sets D6. The actual power source at runtime may be determined using the GetStatus(DEVICE) request.<br>If a device configuration supports remote wakeup, D5 is set to one. |
| 8 | bMaxPower | 1 | Ma | Maximum power consumption of the USB device from the bus in this specific configuration when the device is fully operational. Expressed in 2 mA units (i.e., 50 = 100 ma)<br>Note: A device configuration reports whether the configuration is bus-powered or self powered. Device status reports whether the device is self powered. If a device is disconnected from its external power source, it updates device status to indicate that it is no longer self powered.<br>A device may not increase its power draw from the bus, when it loses its external power source, beyond the amount reported by its configuration.<br>If a device can continue to operate when disconnected from its external power source, it continues to do so. If the device cannot continue to operate, it fails operations it can no longer support. The USB system software may determine the cause of the failure by checking the status and noting the loss of the device's power source. |

High speed capable devices must also define a set of descriptors describing how the device would perform if it were operating at the other speed. The OTHER_SPEED_CONFIGURATION descriptor is used for this purpose. It is identical in operation and format to the CONFIGURATION descriptor except that the descriptor type is changed to OTHER_SPEED_CONFIGURATION.

Most USB devices associate a single interface with a particular device function. There are some devices, however, that require multiple interfaces for a single function. In this scenario, the device will use an INTERFACE_ASSOCIATION descriptor immediately preceding the INTERFACE_DESCRIPTORS that are associated with each other. Multiple INTERFACE_ASSOCIATION descriptors are allowed. The INTERFACE_ASSOCIATION descriptor is formatted as shown in Table 13 below.

TABLE 13

INTERFACE_ASSOCIATION Descriptor

| Offset | Field | Size | Value | Description |
|---|---|---|---|---|
| 0 | bLength | 1 | Number | Size of this descriptor in bytes |
| 1 | bDescriptoType | 1 | Constant | INTERFACE_ASSOCIATION descriptor type |
| 2 | bFirstInterface | 1 | Number | Interface number of the first interface that is associated with this function. |
| 3 | bInterfaceCount | 1 | Number | Number of contiguous interfaces that are associated with this function. |
| 4 | bFunctionClass | 1 | Class | Class code (assigned by USB-IF) A value of zero is not allowed in this descriptor. If this field is FFH, the function class is vendor specific. All other values are reserved for assignment by the USB-IF. |
| 5 | bFunctionSubClass | 1 | SubClass | Subclass code (assigned by USB-IF) If the bFunctionClass field is not set to FFH, all values are reserved for assignment by the USBIF. |
| 6 | bFunctionProtocol | 1 | Protocol | Protocol code (assigned by USB-IF). These codes are qualified by the values of the bFunctionClass and bFunctionSubClass fields. |
| 7 | iFunction | 1 | Index | Index of string descriptor describing this function. |

The INTERFACE descriptor describes a specific interface within a configuration. A configuration provides one or more interfaces, each with zero or more endpoint descriptors describing a unique set of endpoints within the configuration. When a configuration supports more than one interface, the endpoint descriptors for a particular interface follow the INTERFACE descriptor in the data returned by the GetConfiguration( ) request.

An interface may include alternate settings that allow the endpoints and/or their characteristics to be varied after the device has been configured. The default setting for an interface is always alternate setting zero.

The SetInterface( ) request is used to select an alternate setting or to return to the default setting. The GetInterface( ) request returns the selected alternate setting. Alternate settings allow a portion of the device configuration to be varied while other interfaces remain in operation. If a configuration has alternate settings for one or more of its interfaces, a separate INTERFACE descriptor and its associated endpoints are included for each setting.

If an interface uses only endpoint zero, no ENDPOINT descriptors follow the interface descriptor. In this case, the bNumEndpoints field must be set to zero. An INTERFACE descriptor never includes endpoint zero in the number of endpoints. The INTERFACE descriptor may be formatted as shown in Table 14 below.

TABLE 14

INTERFACE Descriptor

| Offset | Field | Size | Value | Description |
|---|---|---|---|---|
| 0 | bLength | 1 | Number | Size of this descriptor in bytes |
| 1 | bDescriptoType | 1 | Constant | INTERFACE descriptor type |
| 2 | bInterfaceNumber | 1 | Number | Number of this interface. Zero-based value identifying the index in the array of concurrent interfaces supported by this configuration. |
| 3 | bAlternateSetting | 1 | Number | Value used to select this alternate setting for the interface identified in the prior field. |
| 4 | bNumEndpoints | 1 | Number | Number of endpoints used by this interface (excluding endpoint zero). If this value is zero, this interface only uses the Default Control Pipe. |
| 5 | bInterfaceClass | 1 | Class | Class code (assigned by the USB-IF). A value of zero is reserved for future standardization. If this field is set to FFH, the interface class is vendor-specific. All other values are reserved for assignment by the USB-IF. |
| 6 | bInterfaceSubClass | 1 | SubClass | Subclass code (assigned by the USB-IF). These codes are qualified by the value of the bInterfaceClass field. If the bInterfaceClass field is reset to zero, this field must also be reset to zero. If the bInterfaceClass field is not set to FFH, all values are reserved for assignment by the USB-IF. |

TABLE 14-continued

INTERFACE Descriptor

| Offset | Field | Size | Value | Description |
|---|---|---|---|---|
| 7 | bInterfaceProtocol | 1 | Protocol | Protocol code (assigned by the USB). These codes are qualified by the value of the bInterfaceClass and the bInterfaceSubClass fields. If an interface supports class-specific requests, this code identifies the protocols that the device uses as defined by the specification of the device class.<br>If this field is reset to zero, the device does not use a class-specific protocol on this interface.<br>If this field is set to FFH, the device uses a vendor-specific protocol for this interface. |
| 8 | iFunction | 1 | Index | Index of string descriptor describing this interface |

ENDPOINT descriptors for each interface follow the INTERFACE descriptor for that interface The ENDPOINT descriptors are formatted as shown in Table 15 below.

TABLE 15

ENDPOINT Descriptor

| Offset | Field | Size | Value | Description |
|---|---|---|---|---|
| 0 | bLength | 1 | Number | Size of this descriptor in bytes |
| 1 | bDescriptoType | 1 | Constant | ENDPOINT descriptor type |
| 2 | bEndpointAddress | 1 | Endpoint | The address of the endpoint on the USB device described by this descriptor. The address is encoded as follows:<br>Bit 3 . . . 0: The endpoint number<br>Bit 6 . . . 4: Reserved, reset to zero<br>Bit 7: Direction, ignored for control endpoints<br>0 = OUT endpoint<br>1 = IN endpoint |
| 3 | bmAttributes | 1 | Bitmap | This field describes the endpoint's attributes when it is configured using the bConfigurationValue.<br>Bits 1 . . . 0: Transfer Type<br>00 = Control<br>01 = Isochronous<br>10 = Bulk<br>11 = Interrupt<br>If not an isochronous endpoint, bits 5 . . . 2 are reserved and must be set to zero. If isochronous, they are defined as follows:<br>Bits 3 . . . 2: Synchronization Type<br>00 = No Synchronization<br>01 = Asynchronous<br>10 = Adaptive<br>11 = Synchronous<br>Bits 5 . . . 4: Usage Type<br>00 = Data endpoint<br>01 = Feedback endpoint<br>10 = Implicit feedback data endpoint<br>11 = Reserved<br>All other bits are reserved and must be reset to zero.<br>Reserved bits must be ignored by the host. |
| 4 | wMaxPacketSize | 2 | Number | Maximum packet size this endpoint is capable of sending or receiving when this configuration is selected.<br>For isochronous endpoints, this value is used to reserve the bus time in the schedule, required for the per-(micro) frame data payloads. The pipe may, on an ongoing basis, actually use less bandwidth than that reserved. The device reports, if necessary, the actual bandwidth used via its normal, non-USB defined mechanisms.<br>For all endpoints, bits 10 . . . 0 specify the maximum packet size (in bytes).<br>For high-speed isochronous and interrupt endpoints: |

TABLE 15-continued

ENDPOINT Descriptor

| Offset | Field | Size | Value | Description |
|---|---|---|---|---|
| | | | | Bits 12 ... 11 specify the number of additional transaction opportunities per microframe:<br>00 = None (1 transaction per microframe)<br>01 = 1 additional (2 per microframe)<br>10 = 2 additional (3 per microframe)<br>11 = Reserved<br>Bits 15 ... 13 are reserved and must be set to zero. |
| 6 | bInterval | 1 | Number | Interval for polling endpoint for data transfers. Expressed in frames or microframes depending on the device operating speed (i.e., either 1 millisecond or 125 µs units). For full-/high-speed isochronous endpoints, this value must be in the range from 1 to 16. The bInterval value is used as the exponent for a $2^{bInterval-1}$ value; e.g., a bInterval of 4 means a period of 8 ($2^{4-1}$). For full-/low-speed interrupt endpoints, the value of this field may be from 1 to 255. For high-speed interrupt endpoints, the bInterval value is used as the exponent for a $2^{bInterval-1}$ value; e.g., a bInterval of 4 means a period of 8 ($2^{4-1}$). This value must be from 1 to 16. For high-speed bulk/control OUT endpoints, the bInterval must specify the maximum NAK rate of the endpoint. A value of 0 indicates the endpoint never NAKs. Other values indicate at most 1 NAK each bInterval number of microframes. This value must be in the range from 0 to 255. |

STRING descriptors are not returned for the GetDescriptor commands for CONFIGURATION or OTHER_SPEED_CONFIGURATION. They must be accessed with separate GetDescriptor commands foe STRING type, specifying the index. STRING descriptors are optional. If a device does not support string descriptors, all references to string descriptors within device, configuration, and interface descriptors must be reset to zero.

STRING descriptors may use UNICODE encodings as defined by The Unicode Standard, Worldwide Character Encoding, Version 3.0, The Unicode Consortium, Addison-Wesley Publishing Company, Reading, Mass. The strings in a USB device may support multiple languages. When requesting a STRING descriptor, the requester specifies the desired language using a sixteen bit language ID (LANGID) defined by the USB-IF. The list of currently defined USB LANGIDs can be found at http://www.usb.org/developers/docs.html. String index zero for all languages returns a STRING descriptor that contains an array of two-byte LANGID codes supported by the device. A USB device may omit all string descriptors. USB devices that omit all string descriptors must not return an array of LANGID codes.

The array of LANGID codes is not NULL-terminated. The size of the array (in bytes) is computed by subtracting two from the value of the first byte of the descriptor. UNICODE encoded strings are not NULL terminated either. STRING descriptors can be formatted as shown in Table 16 below.

TABLE 16

STRING Descriptor

| Offset | Field | Size | Value | Description |
|---|---|---|---|---|
| 0 | bLength | 1 | Number | Size of this descriptor in bytes |

TABLE 16-continued

STRING Descriptor

| Offset | Field | Size | Value | Description |
|---|---|---|---|---|
| 1 | bDescriptoType | 1 | Constant | STRING descriptor type |
| 2 | wLANGID/<br>bString | N | Number | Array of LANGIDs for index 0 UNICODE encoded string all other indices |

The USB2I2CH32 may use two vendor specific descriptors. The first descriptor, known as the MULTI_CHANNEL_SUBRATE_CONTROLLER (MCSC) descriptor, informs the driver of the device architecture and the proper INTERFACE descriptor indices to use for each device activity. It is returned during the GetDescriptor command for CONFIGURATION. The second descriptor is the CHANNEL_SELECT descriptor. It is a dynamic descriptor and is only accessed by GetDescriptor and SetDescriptor commands for type CHANNEL_SELECT at index zero. The MULTI_CHANNEL_SUBRATE_CONTROLLER descriptor may be formatted as shown in Table 1 above. The CHANNEL_SELECT descriptor may be formatted as shown in Table 2 above.

Enumeration is the process where the USB host controller identifies a newly attached device, assigns it an address and a driver, configures it and readies it for operation. Enumeration may begin when a device is first attached.

During enumeration, the host may reset the device. Reset signaling allows the host to determine the connection speed of the device. The host can then issue a GetDescriptor command for DEVICE_TYPE and reads the first 8 bytes of the DEVICE descriptor. This allows it to determine the maximum packet size for ENDPOINT. It then resets the device again.

After the second reset the host sends a SET_ADDRESS command to the device. The new address does not take effect until after the successful completion of the status stage of the command. Subsequently, the host issues a GetDescriptor, DEVICE type command. This time it requests the full descriptor.

If the device is attached in F/S or H/S mode, the host then issues a GetDescriptor, DEVICE_QUALIFIER type to determine whether or not the device is capable of operating at another speed.

Subsequently, the host can read the device configurations specified in the NumConfigurations byte of the DEVICE descriptor. For the USB2I2CH32 device there is only one configuration. Then for each configuration, the host can first issues a GetDescriptor, CONFIGURATION type to read the 9 bytes of the descriptor to determine total size of the configuration, and then issue a GetDescriptor, CONFIGURATION type for the full configuration and all subsequent (INTERFACE_ASSOCIATION, INTERFACE, ENDPOINT, class, and/or vendor) descriptors. It then reads the descriptors using wTotalLength/CEMAXSIZE packets at CEMAXSIZE and one short packet21 until the total configuration is read.

Once all configurations are read, if the device supports more than one speed, it will issue one or more GetDescriptor, OTHER_SPEED_CONFIGURATION commands to determine how the device would operate at the other speed. Finally, the host will issue zero or more GetDescriptor, STRING type commands to read any string data available for the device. It then uses the class and subclass data available in the descriptors to load any class drivers necessary to operate the device. If there is no class specific data applicable to the devices, the host will use the vendor identification (VID) and product identification (PID) fields from the DEVICE descriptor in order to determine which driver to load.

When the driver is loaded, it will reread all CONFIGURATION and STRING descriptors, determine a configuration, read the device status, and finally issue a SetConfiguration command to the device. The device is now ready to use.

FIGS. 27A-27F illustrate example protocol flows for USB212CH32 enumeration in accordance with embodiments of the present invention.

The USB2I2CH32 uses the SetDescriptor, CHANNEL_SELECT index 0 to manage its protocol for endpoints 1, 2, 3, and 4. When the SetDescriptor command completes successfully, the address counter is cleared to zero and the transfer size counter is set to the size specified in wLength. A SetDescriptor CHANNEL_SELECT index 0 command must precede any transfer to endpoints 1, 2, 3, and 4. You will get a STALL response if you attempt an IN or OUT transaction to endpoints 1, 2, 3, or 4 without first setting the CHANNEL_SELECT descriptor. If you issue a SetDescriptor CHANNEL_SELECT index 0 command with bmDirection set to OUT to a channel that is busy, you will receive a STALL response. The CHANNEL_SELECT descriptor may be used to reset an operating I²C bus.

In the next table, assume channel 0 is busy and channel 1 is not. The data for the CHANNEL_SELECT descriptor for channel 0 is as shown in Table 17 below.

TABLE 17

| Channel 0 CHANNEL_SELECT Descriptor | | | | |
|---|---|---|---|---|
| Offset | Field | Size | Value | Description |
| 0 | bLength | 1 | Number | 6 |
| 1 | bDescriptoType | 1 | Constant | CHANNEL_SELECT |
| 2 | bmDirection | 1 | Bitmap | 0x01 |

TABLE 17-continued

| Channel 0 CHANNEL_SELECT Descriptor | | | | |
|---|---|---|---|---|
| Offset | Field | Size | Value | Description |
| 3 | wLength | 2 | Count | 0x0100 |
| 5 | bChannel | 1 | Number | 0x00 |

The data for the CHANNEL_SELECT descriptor for channel 1 is as shown in Table 17 below.

TABLE 18

| Channel 1 CHANNEL_SELECT Descriptor | | | | |
|---|---|---|---|---|
| Offset | Field | Size | Value | Description |
| 0 | bLength | 1 | Number | 6 |
| 1 | bDescriptoType | 1 | Constant | CHANNEL_SELECT |
| 2 | bmDirection | 1 | Bitmap | 0x01 |
| 3 | wLength | 2 | Count | 0x0100 |
| 5 | bChannel | 1 | Number | 0x00 |

Figure 28:
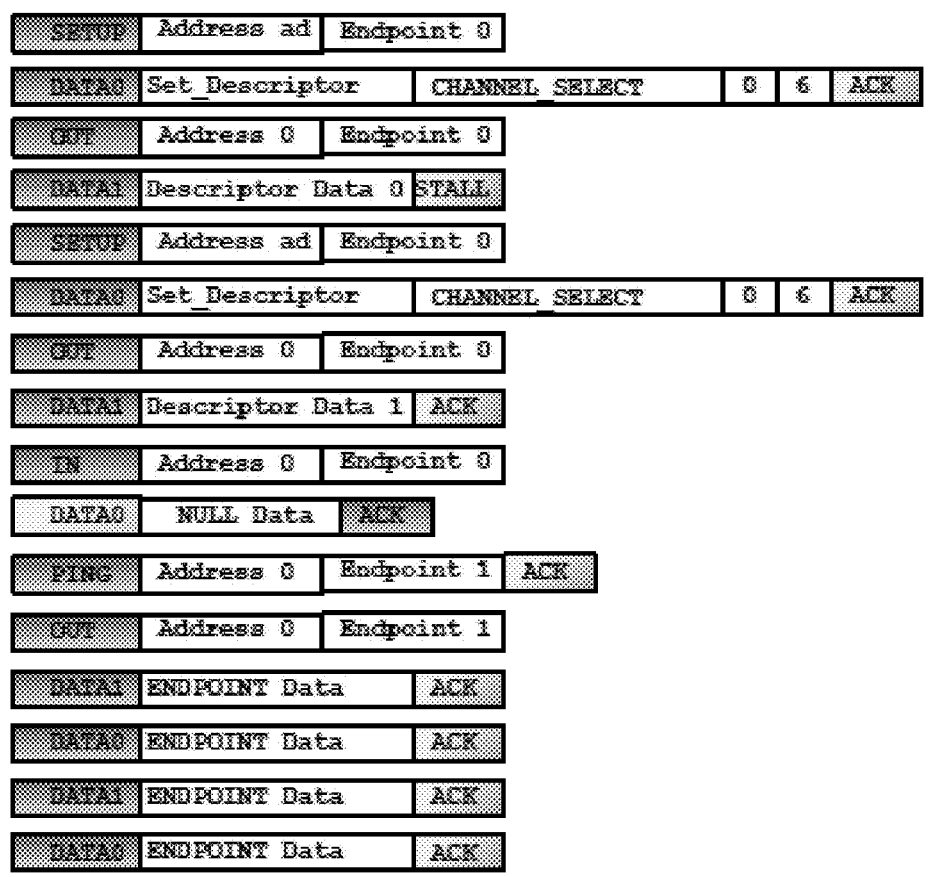
FIG. 28 is an example protocol flow for a USB212CH32 transaction in accordance with embodiments of the present invention.

The transactions would then appear as shown by FIG. 28, which illustrates an example protocol flow for a USB212CH32 transaction in accordance with embodiments of the present invention.

Data overruns may be handled differently between IN and OUT endpoints. Data overruns from an IN endpoint simply require USB2I2CH32 device to send a short packet at the end of the data. If the last packet sent was equal to the endpoint maximum transfer size, an additional zero length data packet is sent. For out endpoints, the overrun DATAx packet is acknowledged by a functional stall.

The I²C interface is a 2-wire, open drain, multi-master, multi-drop, half duplex, serial bus with transfer speeds of up to 3.4 Mbs. The I²C interface uses a master-slave protocol. All transfers may be unary (single master, single slave) in nature, and initiated and controlled by the master. Slave devices may be able to extend transfer timing by a "clock-stretching" mechanism, whereby they can hold the transfer timing signal (SCL) low for an additional period. Individual I²C transactions may either read or write data from a single slave device.

In an I²C idle condition, all masters and all slaves may be in a non-driving state, and both SDA and SCL are at a high level. During warm system restarts, the USB2I2CH32 can provide a mechanism to return slave devices lacking asynchronous reset capabilities to idle condition.

I²C transfer timing may be set by the lowest speed device involved in the transfer. I²C is an open-drain bus; meaning that driving devices may only set the bus to a low level. Pullup resistors return it to a high level. The master attempts to set the driving speed by setting SCL low at intervals of twice the selected transfer bit rate (transfer rates for the USB2I2CH32 can be either 100 Kbs or 400 Kbs) and cease drive at 1/(2× transfer rate) later. If the slave device(s) needs to extend the transfer interval, it may continue to drive SCL low until it is ready to accept another bit. This process is known as "clock stretching". When SCL returns to a high level, the master can wait at least 1/(2× transfer rate) before diving SCL low again. Clock stretching can only affect the total period of a bit transfer and not duty cycle of SCL.

Normally SDA can only transition while SCL is at a low level. There are two exceptions. When the I²C bus is transitioning from an idle to an active state, the master device will hold SCL inactive (high) while driving SDA from high to low. This is known as a start pulse. When the I²C bus is transitioning from an active to an idle state, the master may leave SCL high while transitioning SDA from low to high.

Figure 29:
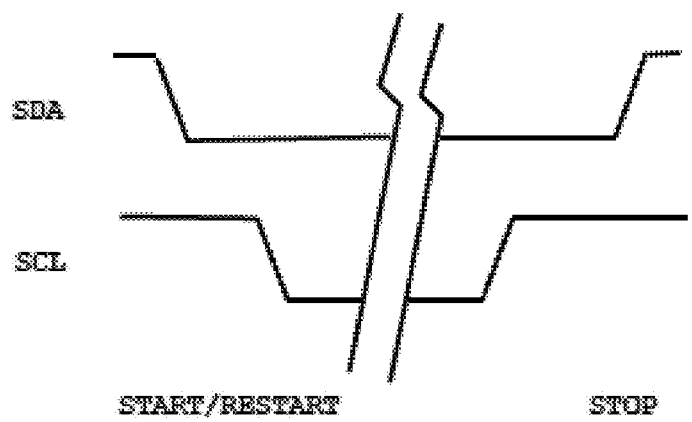
FIG. 29 is a diagram showing I2C START and STOP pulses in accordance with embodiments of the present invention.

This is known as a stop pulse. Stop pulses are not required for every transaction. For instance, in the case where an I²C transaction immediately follows another transaction, the second start pulse can serve as both a stop pulse for the previous transaction and the start pulse for the subsequent transaction (known as a re-start). FIG. 29 illustrates a diagram showing I2C START and STOP pulses in accordance with embodiments of the present invention. Stop pulses are not sent when a transaction ends in a negative acknowledge (NAK) from either the master or slave device.

I²C addresses and data are sent as octets (8-bits) on SDA, most significant bit first. Following each octet is a single cycle acknowledge sent from the address or data destination device.

I²C addresses are sent by the master with an octet on SDA immediately following the start pulse. The octet contains the slave device address in bits 7:1 and the direction of the data transfer in bit 0. A one in but zero indicates a read transaction, that is data will be transferred from the slave to the master. A zero indicates a write transaction where data is transferred from the master to the slave. When a slave device recognizes its address, it can pull SDA low for one SCL cycle immediately after the read/write bit of the address octet. This is known as address acknowledge. If SDA remains high during this period (negative acknowledge or NAK), the master will immediately terminate the transaction and return the bus to idle.

Figure 30:
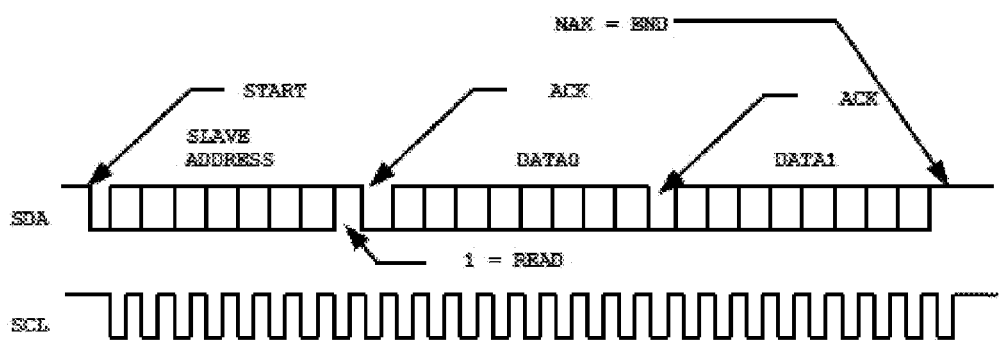
FIG. 30 is a diagram of an example I²C read in accordance with embodiments of the present invention.

The master may begin an I²C read transaction be sending a start pulse followed by an octet containing the slave address in bits 7:1 and a 1 in bit 0, indicating a read operation. The slave device responds by pulling SDA low for a single cycle (address acknowledge), and then immediately sends an octet of data. The master responds to each data octet by pulling SDA low for a single cycle (data acknowledge) following each data octet if it wishes to continue reading subsequent data byes, or by leaving SDA high for this period (NAK) when the last byte has been transferred. The NAK terminates the transfer and the master and slave devices both return the bus to its idle state. There is no stop pulse required for I²C read transactions. FIG. 30 illustrates a diagram of an example I²C read in accordance with embodiments of the present invention.

Figure 31:
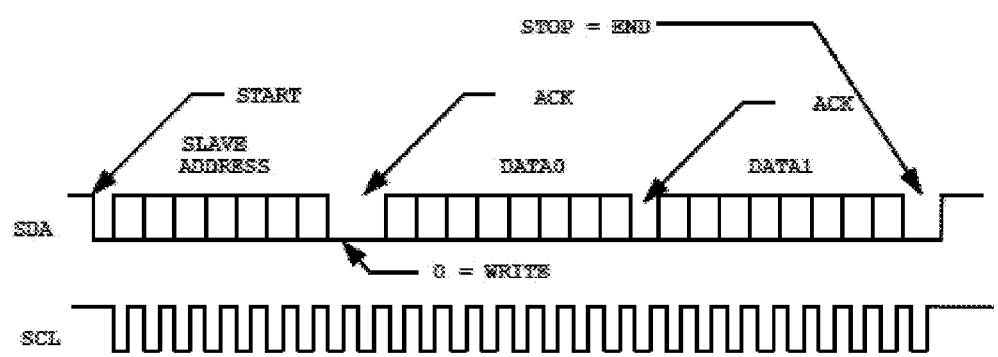
FIG. 31 is a diagram of an example I²C write in accordance with embodiments of the present invention.

The master begins an I²C write transaction be sending a start pulse followed by an octet containing the slave address in bits 7:1 and a zero in bit 0, indicating a write operation. The slave device responds by pulling SDA low for a single cycle (address acknowledge). The master then begins sending octets of data. After each octet, the slave responds by pulling SDA low for a single cycle (data acknowledge). After the last byte of data is transferred the master issues a stop pulse if there are no subsequent I²C transactions, or a re-start to terminate the current transaction and begin the next. FIG. 31 illustrates a diagram of an example I²C write in accordance with embodiments of the present invention.

Although the USB2I2CH32 resembles a Control, Bulk, Interrupt (CBI) device, the CBI class driver does not have enough flexibility to operate the subsystem. Therefore, a vendor specific class and protocol were defined for this device.

The USB2I2CH32 device driver may be able to communicate directly with the Enhanced Host Control Interface (EHCI) driver for high speed operation and with the Open Host Control Interface (OHCI) driver for full speed operation. The application can communicate with the USB2I2CH32 driver using file operations.

Because of the protocol used, the driver cannot be re-entrant and must employ a MUTEX such as a SPINLOCK. To facilitate optimal performance, it is suggested that the driver maintain a transaction queue.

I²C bus operations may be controlled and reported via a structured file. There is one structured file per bus. The files are named /dev/i2cbus<x> where x represents the I²C bus number. Each file contains transmit and receive buffers, followed by the structure:

```
typedef struct {
    unsigned long status;
    unsigned long mask;
    unsigned cfr;
    byte tcr[2];
    byte sar[2];
    byte rsr[2];
    byte tsr[2];
    byte rcr[2];
    byte scr[2];
    unsigned pir;
    byte lir;
    byte icr;
    byte msr;
    byte stl;
    byte cst;
    byte dst;
    byte tst;
    byte lrr;
} I2C_REGS;
``` representing bus values. The file is structured as follows:

```
typedef struct {
    byte xbuff[256];
    byte rbuff[256];
    I2C_REGS regs;
} I2C_BUS;
```

The transmit and receive buffers may be read or written separately. From 1 to 256 bytes of the transmit or receive buffer may be read or written for any transaction. The I2C_REGS structure is also accessed separately. The entire structure must be read or written at one time. When initializing a transaction it must be written last. Normally a process will open a file and first write the transmit buffer. When that write is complete, it can write the receive buffer if a compare operation is going to be used. Finally, it can write the I2C_REGS structure to initiate the I²C bus transaction(s) and closes the file. It can repeat these steps for every bus it wishes to initiate. When the process is informed of an I²C completion via the status monitoring, it can reopen the file, read the receive buffer, read the I2C_REGS structure, and close the file. This can avoid the problems associated with too many file handles.

Status monitoring can be accomplished via a set of service requests read from the file /dev/i2cstatus as a single long unsigned. The read can complete once every two milliseconds for high speed mode or once every twenty milliseconds for full speed mode. Normally, a single process can perform the status monitoring task and then use inter process communications (IPC) message queues to relay the information to the I²C bus processes.

There may be a status mask associated with each IPC message queue. When a service request matching one of the bits in the mask is active, the monitoring task can enter a message into the associated queue. The I²C bus task can then know when to service its associated I²C busses.

When using an FPGA the configuration information needs to be installed in read-only memory (ROM). On some FPGAs, this memory is internal to the FPGA is normally accessed via a IEEE 1144.1 Joint Test Access Group (JTAG) bus. Other FPGAs use an external ROM, and access it with a variety of methods. When an external read only memory (ROM) is used, it may be a one-time programmable (OTP) device, or an erasable electronic programmable read only memory (EEPROM). An EEPROM with programming access via JTAG may be the best solution.

The ULPI and USB transport interfaces may, for example, implement the test modes required by the "Universal Serial Bus Specification Revision 2.0 Apr. 27, 2000" through use of the SetFeature(TEST_MODE), Device command. The standard test modes are:

TABLE 19

Standard Test Modes

| Value | Description |
|---|---|
| 00H | Reserved |
| 01H | Test_J |
| 02H | Test_K |
| 03H | Test_SE0_NAK |
| 04H | Test_Packet |
| 05H | Test_Force_Enable (Downstream facing ports only) |
| 06H-3FH | Reserved for standard test selectors |
| 40H-BFH | Reserved |
| C0H-FFH | Reserved for vendor-specific test modes |

Test mode Test_SE0_NAK: Upon command, a port's transceiver must enter the high-speed receive mode and remain in that mode until the exit action is taken. This enables the testing of output impedance, low level output voltage, and loading characteristics. In addition, while in this mode, upstream facing ports (and only upstream facing ports) must respond to any IN token packet with a NAK handshake (only if the packet CRC is determined to be correct) within the normal allowed device response time. This enables testing of the device squelch level circuitry and, additionally, provides a general purpose stimulus/response test for basic functional testing.

Test mode Test_J: Upon command, a port's transceiver must enter the high-speed J state and remain in that state until the exit action is taken. This enables the testing of the high output drive level on the D+ line.

Test mode Test_K: Upon command, a port's transceiver must enter the high-speed K state and remain in that state until the exit action is taken. This enables the testing of the high output drive level on the D− line.

Test mode Test_Packet: Upon command, a port must repetitively transmit the following test packet until the exit action is taken. This enables the testing of rise and fall times, eye patterns, jitter, and any other dynamic waveform specifications. The test packet is made up by concatenating the following strings. (Note: For J/K NRZI data, and for NRZ data, the bit on the left is the first one transmitted. "S" indicates that a bit stuff occurs, which inserts an "extra" NRZI data bit. "* N" is used to indicate N occurrences of a string of bits or symbols.). Table 20 shows an example test packet.

TABLE 20

Test Packet

| NRZI Symbols (Fields) | NRZ Bit Strings | Number of NRZ Bits |
|---|---|---|
| {KJ * 15}, KK (SYNC) | (00000000 * 3), 00000001 | 32 |
| KKJKJKKK (DATA0 PID) | 11000011 | 8 |

TABLE 20-continued

Test Packet

| NRZI Symbols (Fields) | NRZ Bit Strings | Number of NRZ Bits |
|---|---|---|
| JKJKJKJK * 9 | 00000000 * 9 | 72 |
| JJKKJJKK * 8 | 01010101 * 8 | 64 |
| JJJJKKKK * 8 | 01110111 | 64 |
| JJJJJJJJKKKKKKKK * 8 | 0, {111111S * 15}, 111111 | 97 |
| JJJJJJJK * 8 | S, 111111S, {011111S * 7} | 55 |
| (JKKKKKKK * 10}, JK | 00111111, {S0111111 * 9} | 72 |
| JJJKKKJJKKKKJKKK (CRC16) | 0110110101110011 | 16 |
| JJJJJJJ (EOP) | 01111111 | 8 |

In an example, the port in Test_Packet mode must send this packet repetitively. The inter-packet timing must be no less than the minimum allowable inter-packet gap of 88 bit times (32 bit times as measured at the hosts receptacle), and no greater than 125 μs.

Provisions have been made in the I²C control register files to enable I²C line testing of both SDA and SCL. To perform a short test, use the manual control modes in the configuration register. The read back the state of SDA and SCL from the status register.

Endpoints 1 and 2 are setup so a system memory diagnostic can be run. The diagnostic must first the interface in a disabled state by means of the configuration register, and then the test patterns can be written to and read from the transmit and receive buffers.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a universal serial bus (USB) interface configured to communicatively connect to a computing device;
   a multi-channel interface configured to communicatively connect to a plurality of subrate channels, each subrate channel of the plurality of subrate channels configured to autonomously operate concurrently with other subrate channels of the plurality of subrate channels;
   a controller configured to communicatively connect each of the plurality of subrate channels with the computing device via the USB interface, and configured to communicate concurrently with each of the plurality of subrate channels, to the computing device, connection specifications for each of the plurality of subrate channels; and a plurality of subrate engines that are each associated with one of the plurality of subrate channels, each subrate engine of the plurality of subrate engines configured to communicatively connect register files and buffers associated with each subrate channel of the plurality of subrate channels.

2. The system of claim 1, wherein the USB interface is a USB transport layer interface.

3. The system of claim 1, wherein the plurality of subrate channels are one of I²C, RS-232, and RS-485 channels.

4. The system of claim 1, wherein the connection specifications indicate one of a number of the plurality of subrate channels and a subrate type for each of the plurality of subrate channels.

5. The system of claim 1, wherein the connection specifications indicate one of transmit buffer information, receive buffer information, register information, and subrate protocol information.

6. The system of claim 1, wherein the controller is configured to communicate the connection specifications to the computing device during enumeration.

7. The system of claim 1, further comprising a plurality of buffers that are each associated with one of the plurality of subrate channels.

8. The system of claim 1, further comprising a control interface configured to select one of the plurality of subrate channels for connection with the computing device via the USB interface.

9. The system of claim 8, wherein the controller is configured to reset one of the plurality of subrate subrate channels.

10. The system of claim 8, wherein the controller is configured to select a direction of communication of the plurality of subrate channels.

11. A method comprising:
providing a system comprising a universal serial bus (USB) interface and a multi-channel interface configured to communicatively connect to a plurality of subrate channels, each subrate channel of the plurality of subrate channels configured to autonomously operate concurrently with other subrate channels of the plurality of subrate channels, the system comprising:
a plurality of subrate engines that are each associated with one of the plurality of subrate channels, each subrate engine of the plurality of subrate engines configured to communicatively connect register files and buffers associated with each subrate channel of the plurality of subrate channels;
communicatively connecting the subrate channels with a computing device via the USB interface; and
communicating, to the computing device, concurrently with each of the plurality of subrate channels, connection specifications for each of the plurality of subrate channels.

12. The method of claim 11, wherein the USB interface is a USB transport layer interface.

13. The method of claim 11, wherein each of the plurality of channels are one of I²C, RS-232, and RS-485 channels.

14. The method of claim 11, wherein communicating connection specifications comprises communicating, to the computing device, one of a number of the plurality of subrate channels and a subrate type for each of the plurality of subrate channels.

15. The method of claim 11, wherein communicating connection specifications comprises communicating, to the computing device, one of transmit buffer information, receive buffer information, register information, and subrate protocol information.

16. The method of claim 11, wherein communicating, to the computing device, the connection specifications comprises communicating the connection specifications to the computing device during enumeration.

17. The method of claim 11, further comprising selecting one of the plurality of subrate channels for connection with the computing device via the USB interface.

18. The method of claim 11, further comprising resetting one of the plurality subrate channels.

19. The method of claim 18, further comprising selecting a direction of communication of the plurality of subrate channels.

* * * * *